United States Patent
Shin et al.

(10) Patent No.: US 10,637,606 B2
(45) Date of Patent: Apr. 28, 2020

(54) METHOD AND APPARATUS FOR TRANSMITTING AND RECEIVING SIGNAL USING NON-ORTHOGONAL MULTIPLE ACCESS IN WIRELESS COMMUNICATION SYSTEM

(71) Applicant: LG ELECTRONICS INC., Seoul (KR)

(72) Inventors: Seokmin Shin, Seoul (KR); Kijun Kim, Seoul (KR); Hyungtae Kim, Seoul (KR); Inkwon Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/755,468

(22) PCT Filed: Sep. 5, 2016

(86) PCT No.: PCT/KR2016/009894
§ 371 (c)(1),
(2) Date: Feb. 26, 2018

(87) PCT Pub. No.: WO2017/039413
PCT Pub. Date: Mar. 9, 2017

(65) Prior Publication Data
US 2018/0175968 A1 Jun. 21, 2018

Related U.S. Application Data
(60) Provisional application No. 62/213,631, filed on Sep. 3, 2015.

(51) Int. Cl.
*H04L 1/00* (2006.01)
*H04L 27/34* (2006.01)
(Continued)

(52) U.S. Cl.
CPC ........ *H04L 1/0003* (2013.01); *H04B 7/0456* (2013.01); *H04L 5/0053* (2013.01);
(Continued)

(58) Field of Classification Search
None
See application file for complete search history.

(56) References Cited

U.S. PATENT DOCUMENTS

2016/0013897 A1* 1/2016 Sun ................. H04L 1/0058
                                                            370/312
2017/0317864 A1* 11/2017 Yuan ................... H04L 1/00
2018/0083746 A1* 3/2018 Kang ................ H04L 5/0007

FOREIGN PATENT DOCUMENTS

JP          2014-204277 A       10/2014
KR     10-2013-0014502 A        2/2013
(Continued)

OTHER PUBLICATIONS

Alberto G. Perotti et al., "Non-Orthogonal Multiple Access for Degraded Broadcast Channels: RA-CEMA", 2015 IEEE Wireless Communications and Networking Conference (WCNC), Mar. 2015, pp. 735-740. See p. 735, right column—p. 736, right column.

*Primary Examiner* — Kodzovi Acolatse
*Assistant Examiner* — Jay L Vogel
(74) *Attorney, Agent, or Firm* — Dentons US LLP

(57) ABSTRACT

The present specification provides an operation method of a base station for transmitting and receiving a signal using non-orthogonal multiple access (NOMA) in a wireless communication system. The method comprises the steps of: setting a first modulation scheme and a first transmission power for a first signal to be transmitted to a first user equipment; setting a second modulation scheme and a second transmission power for a second signal to be transmitted to a second user equipment; overlapping the first signal and the second signal; and transmitting a signal (Continued)

obtained by overlapping, wherein the transmission of the overlapped signal uses an overlapping constellation defined in advance or configured by a predetermined notation.

12 Claims, 24 Drawing Sheets

(51) Int. Cl.
*H04W 52/06* (2009.01)
*H04W 52/34* (2009.01)
*H04L 5/00* (2006.01)
*H04B 7/0456* (2017.01)
*H04W 52/14* (2009.01)
*H04W 72/04* (2009.01)

(52) U.S. Cl.
CPC ......... *H04L 27/3488* (2013.01); *H04W 52/06* (2013.01); *H04W 52/346* (2013.01); *H04W 52/143* (2013.01); *H04W 72/042* (2013.01)

(56) References Cited

FOREIGN PATENT DOCUMENTS

| | | |
|---|---|---|
| KR | 10-2013-0073935 A | 7/2013 |
| WO | 2015/046907 A1 | 4/2015 |

* cited by examiner

[Figure 1]
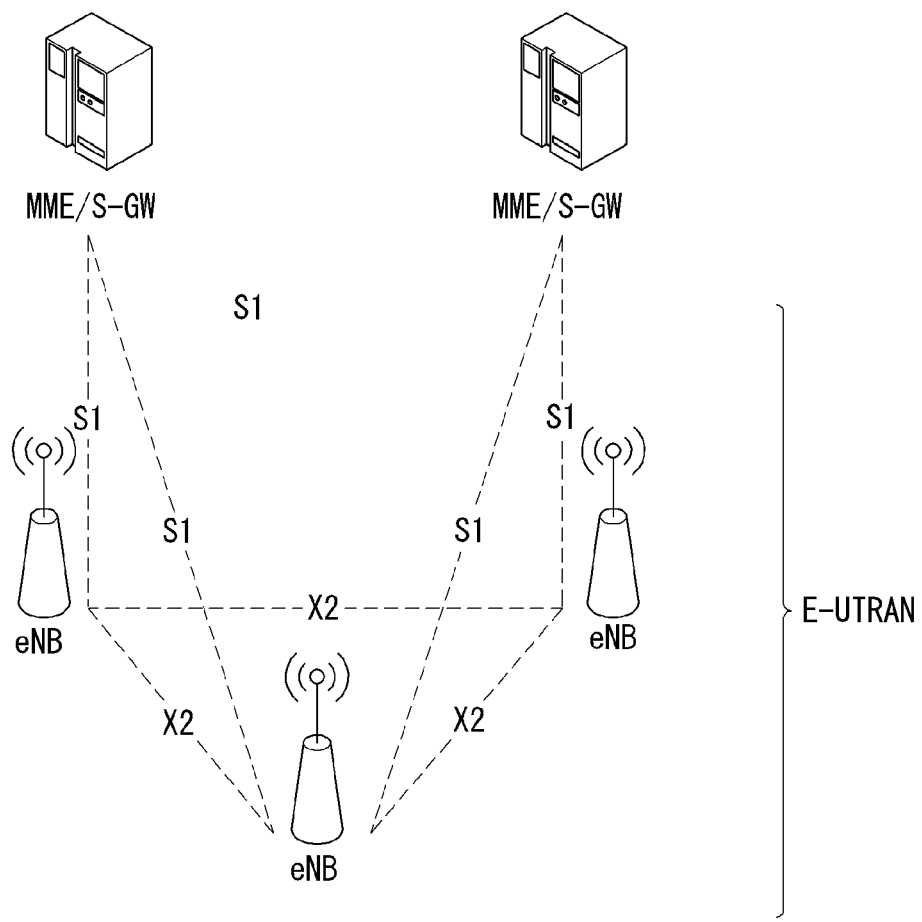

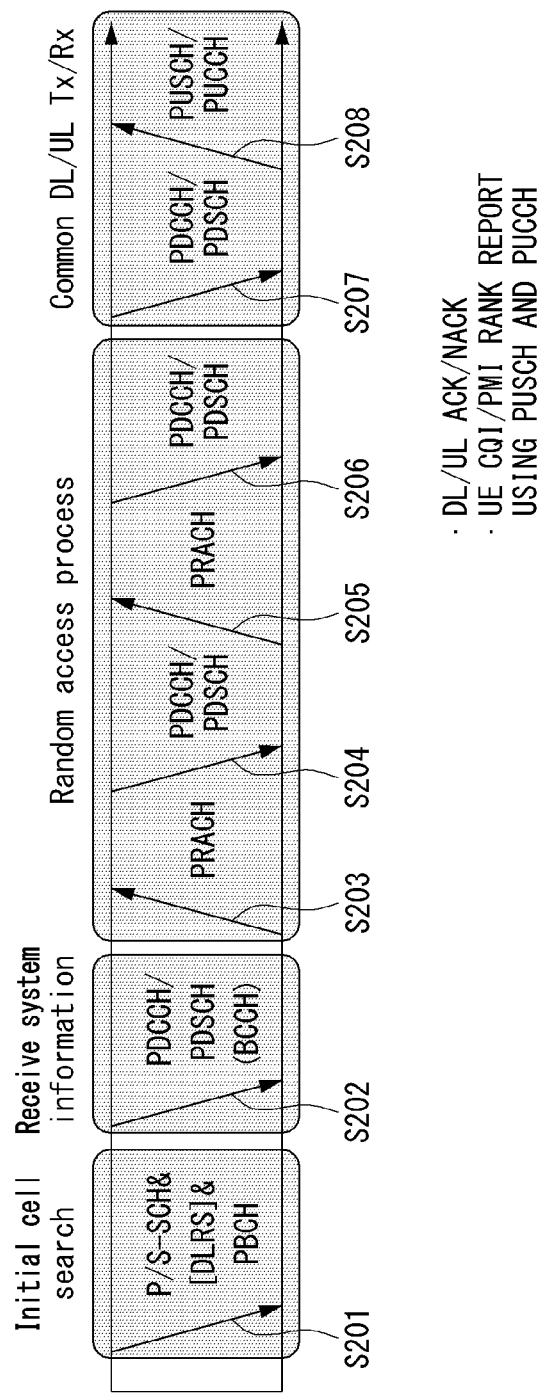
[Figure 2]

[Figure 3]
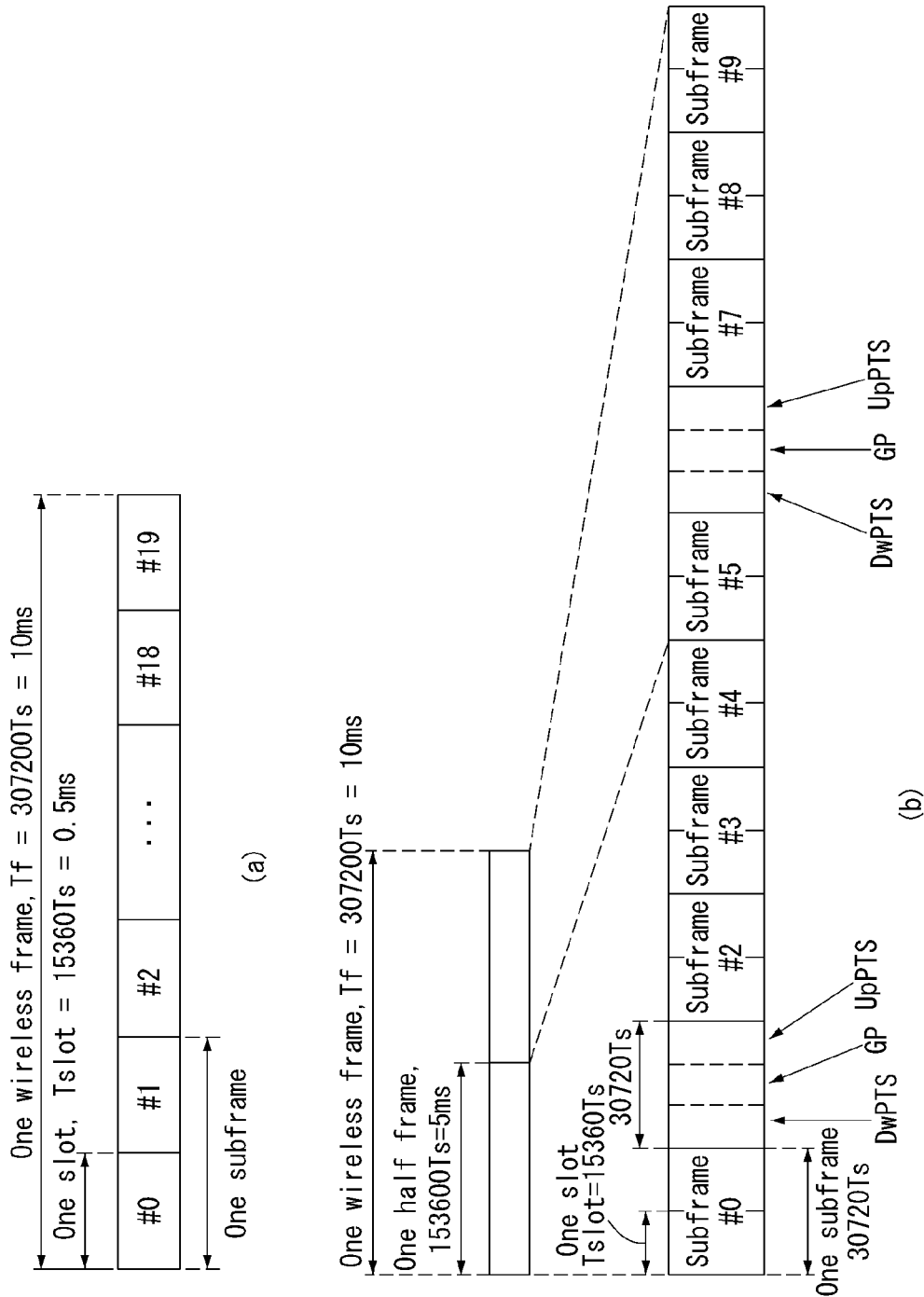

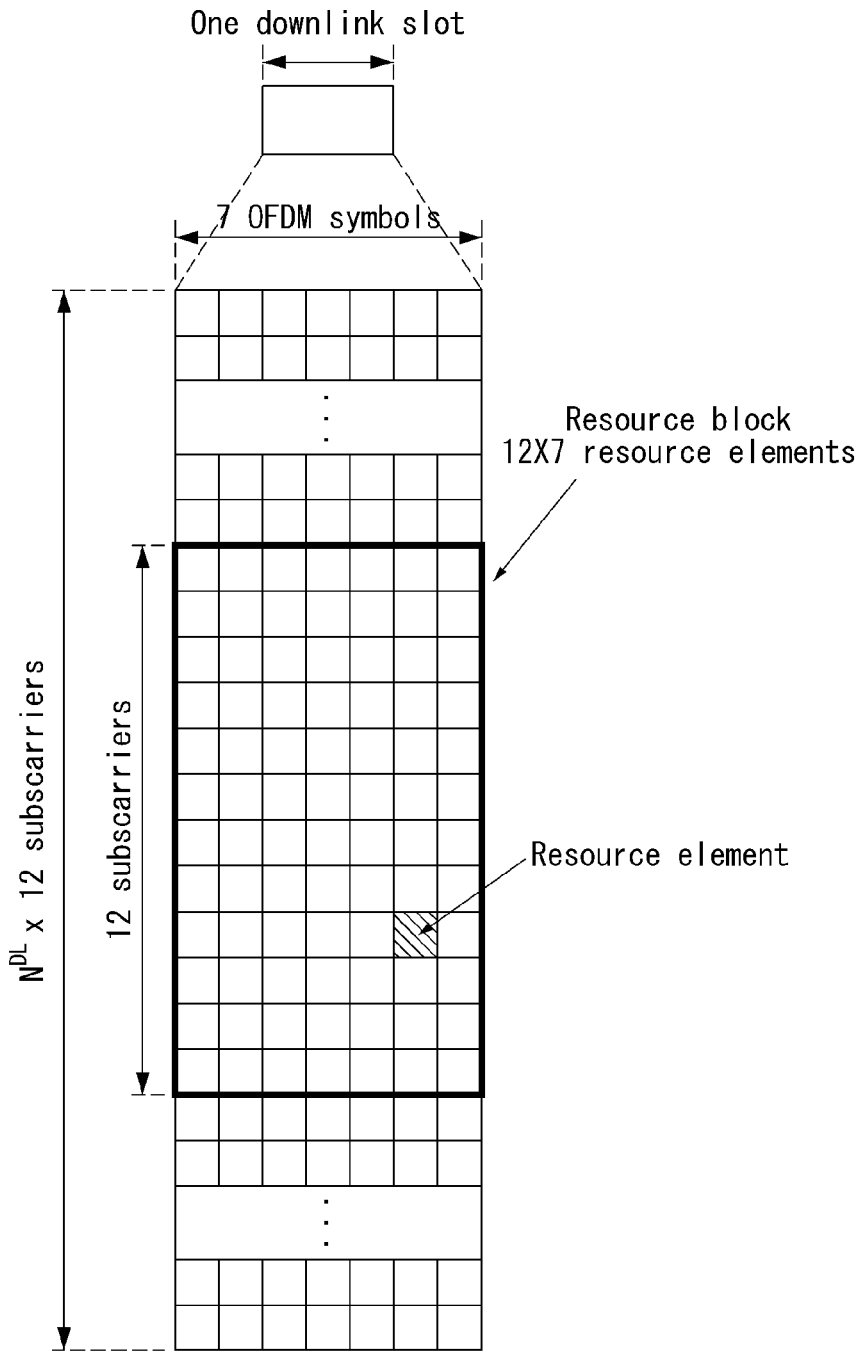
[Figure 4]

[Figure 5]
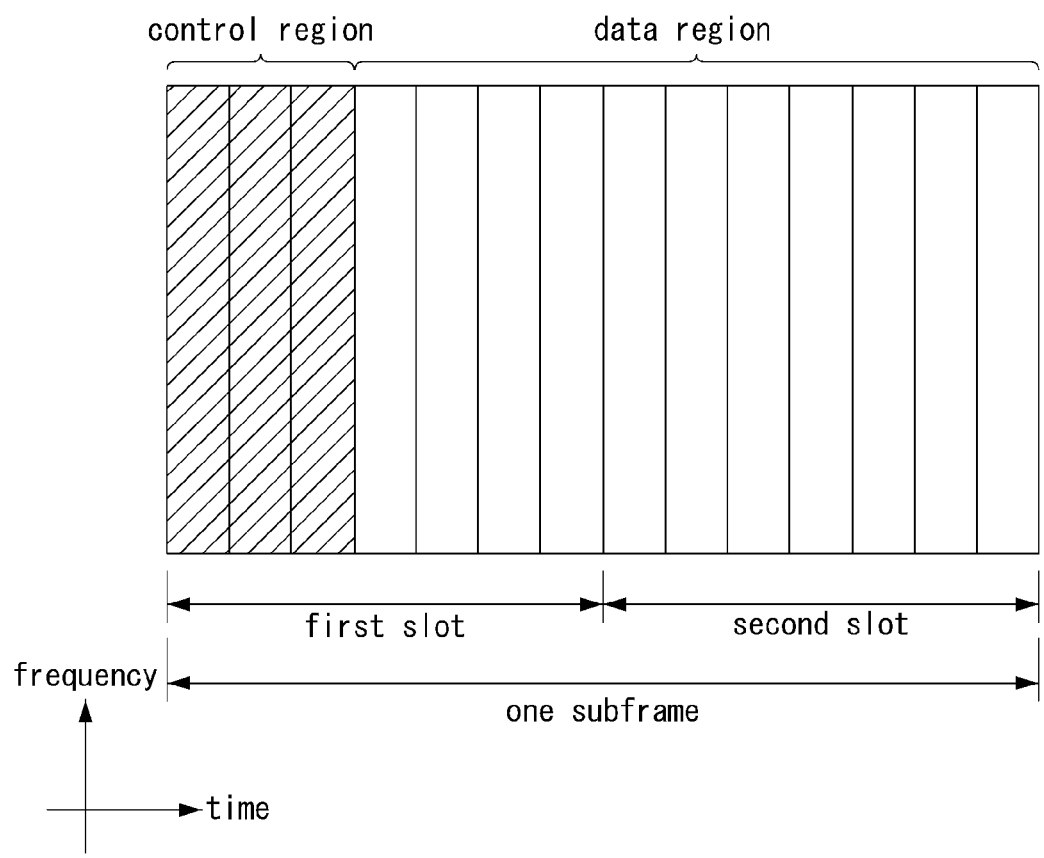

[Figure 6]
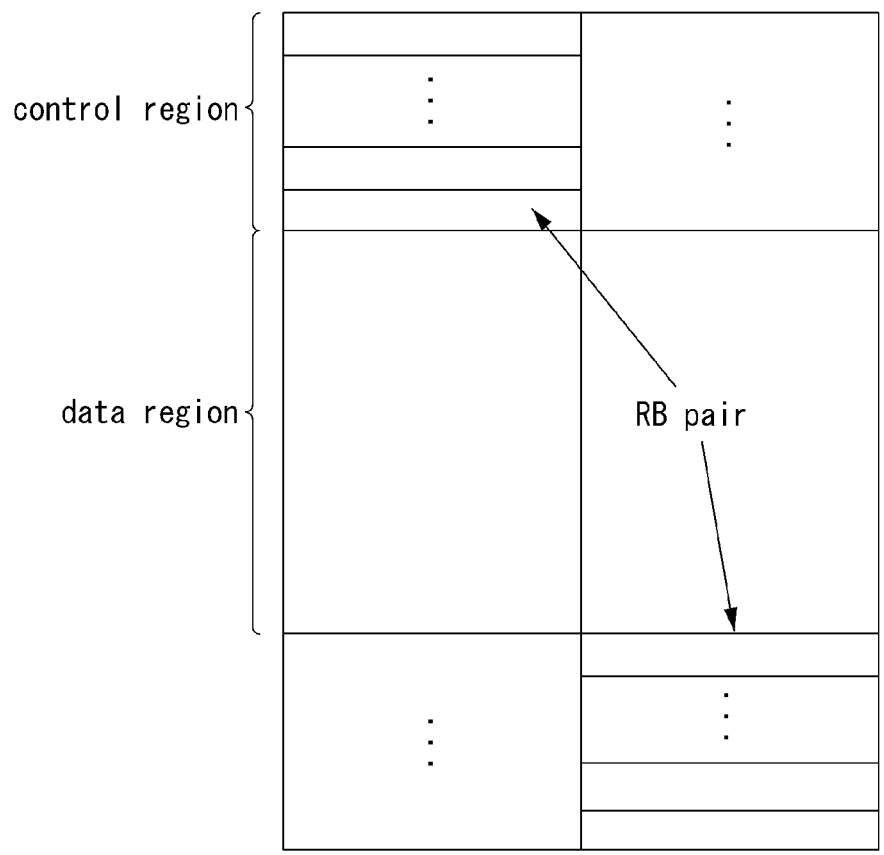

[Figure 7]
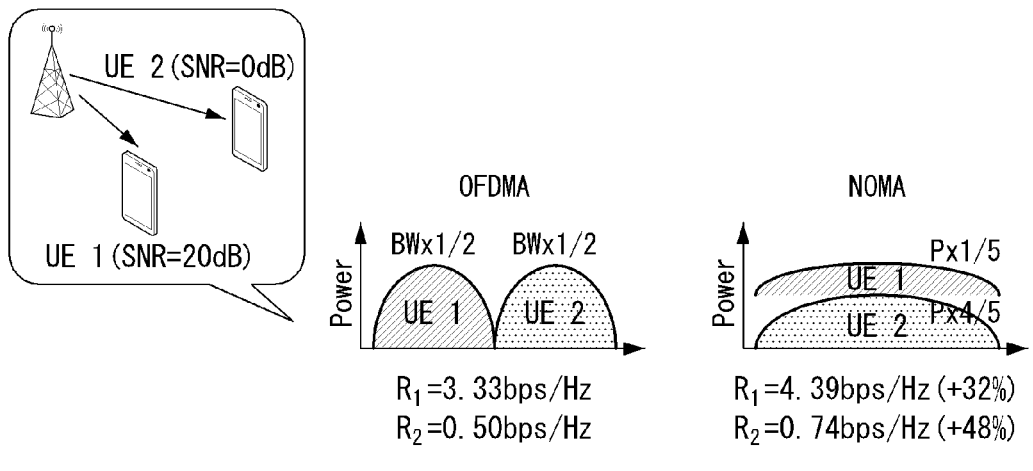
(a)
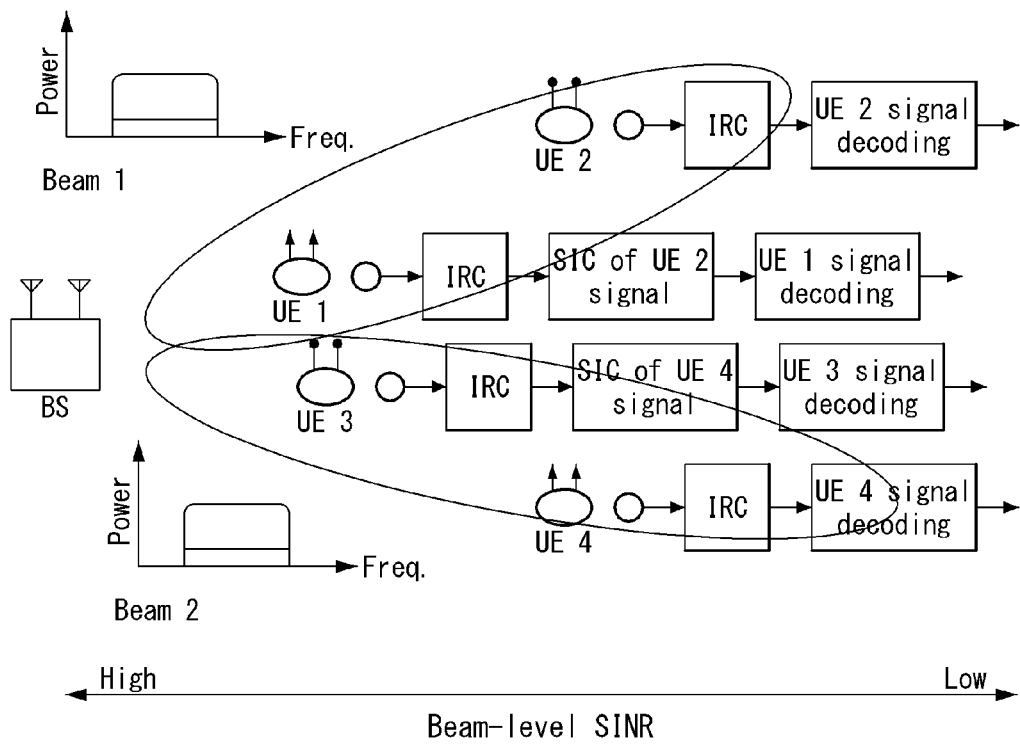
(b)

【Figure 8】
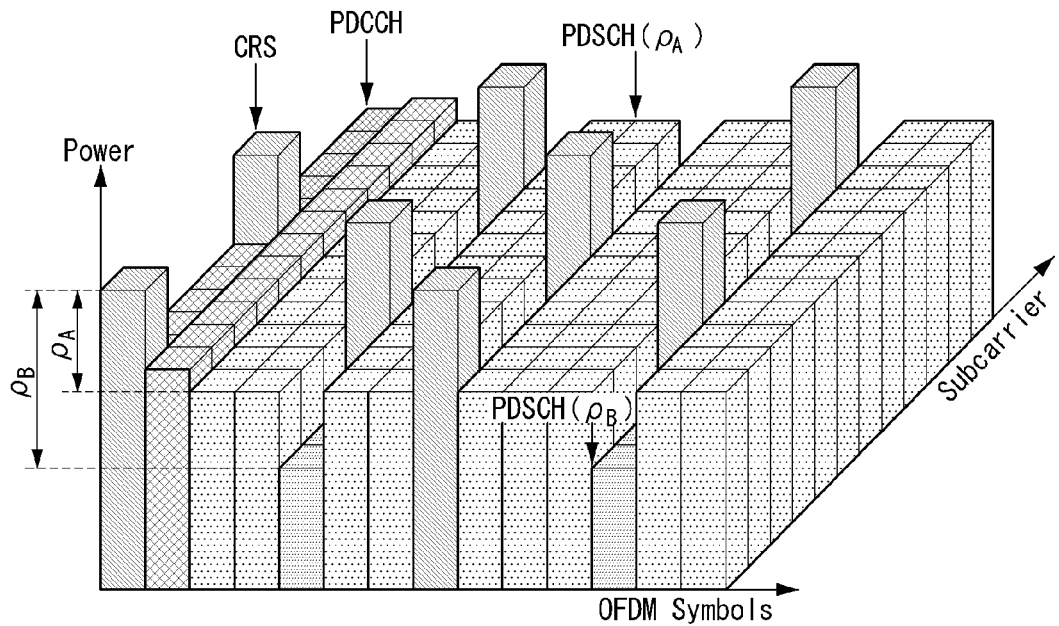
【Figure 9】
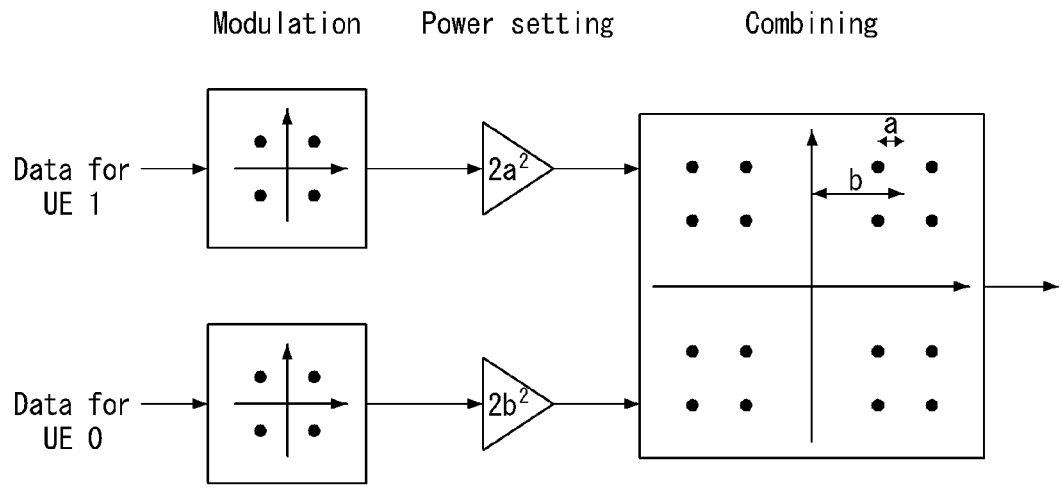

[Figure 10]
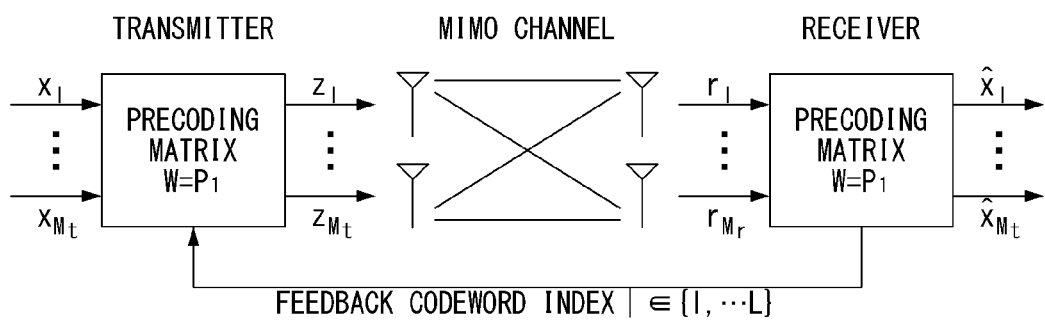

[Figure 11]
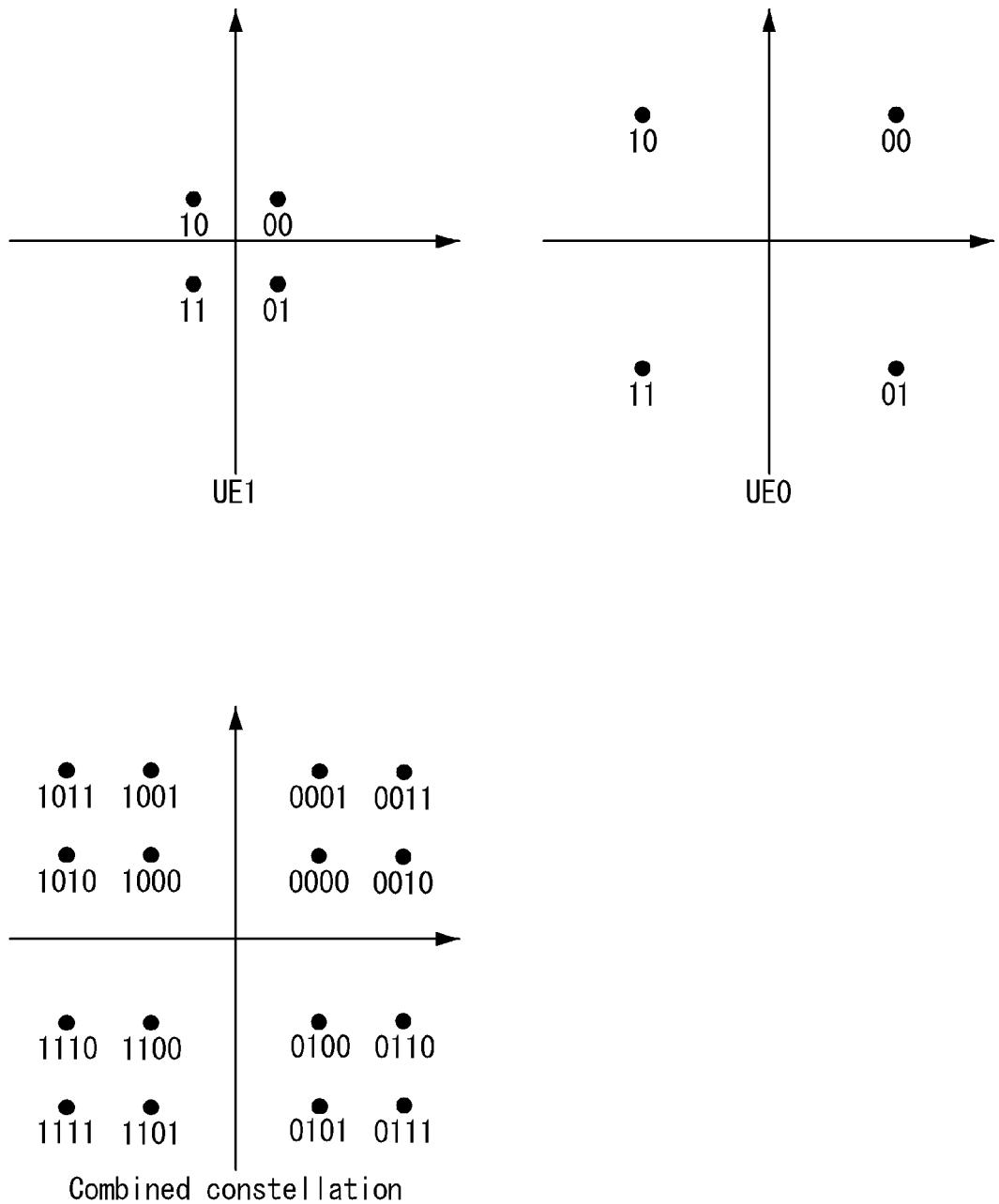

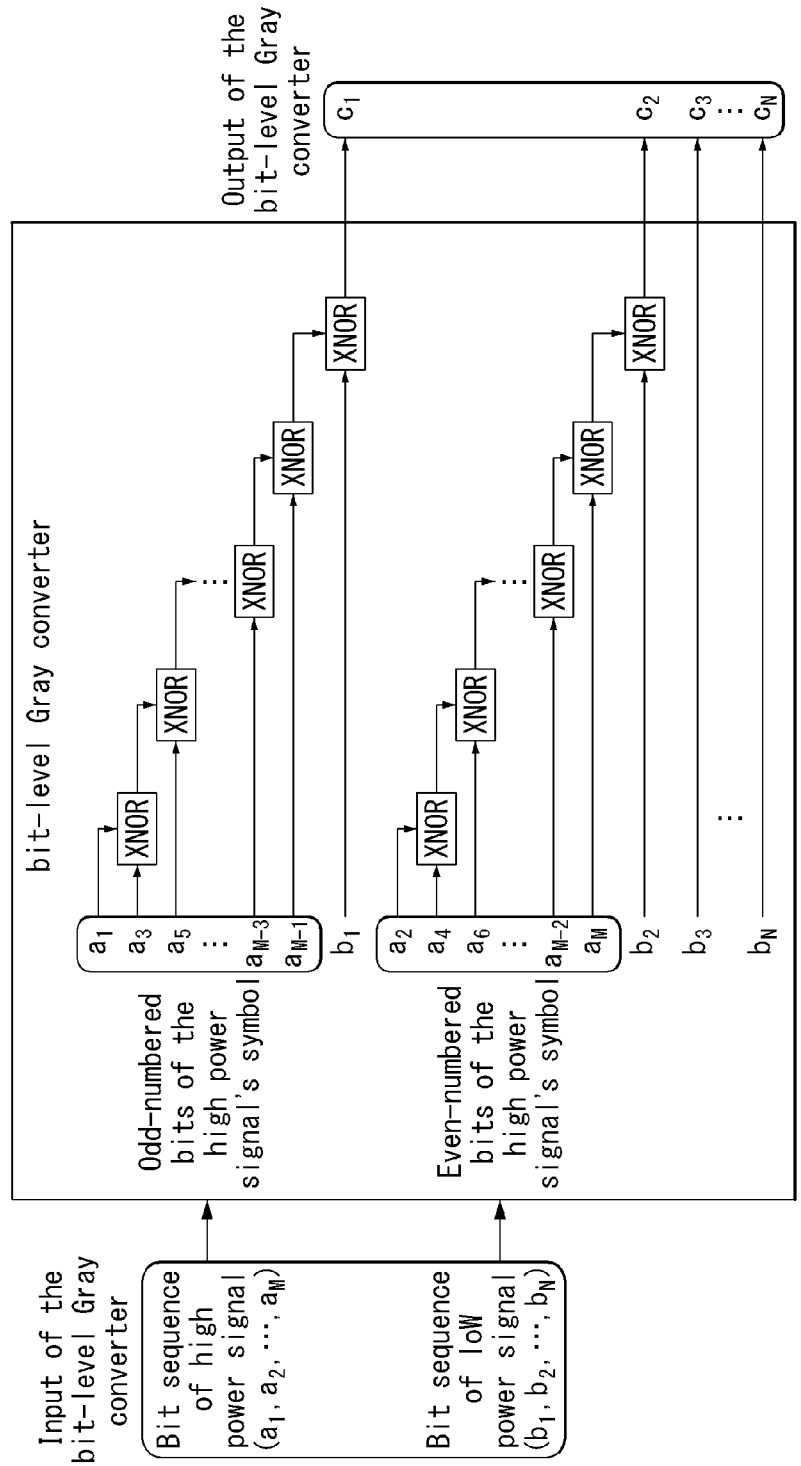
[Figure 12]

[Figure 13]
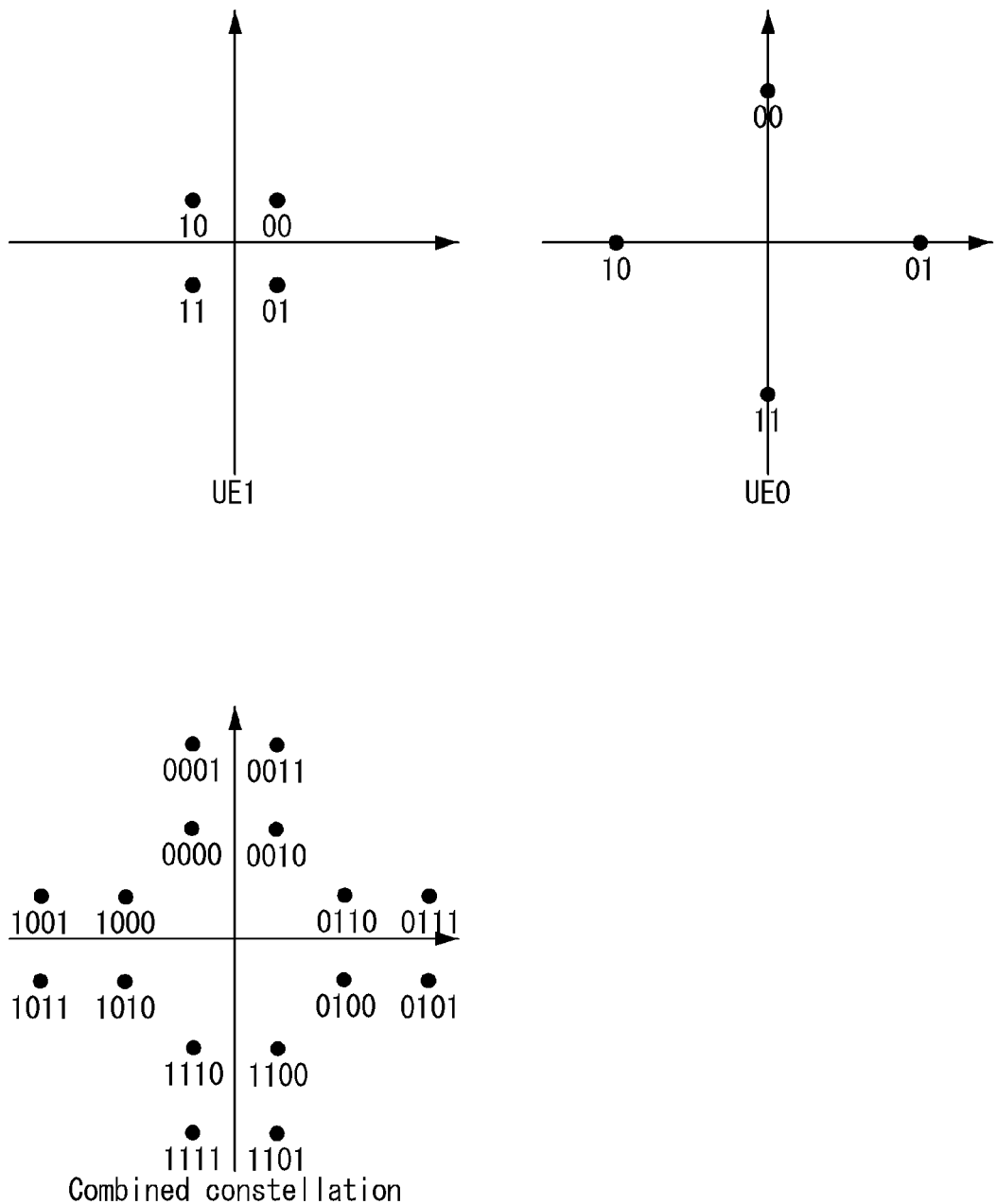
Combined constellation

[Figure 14]
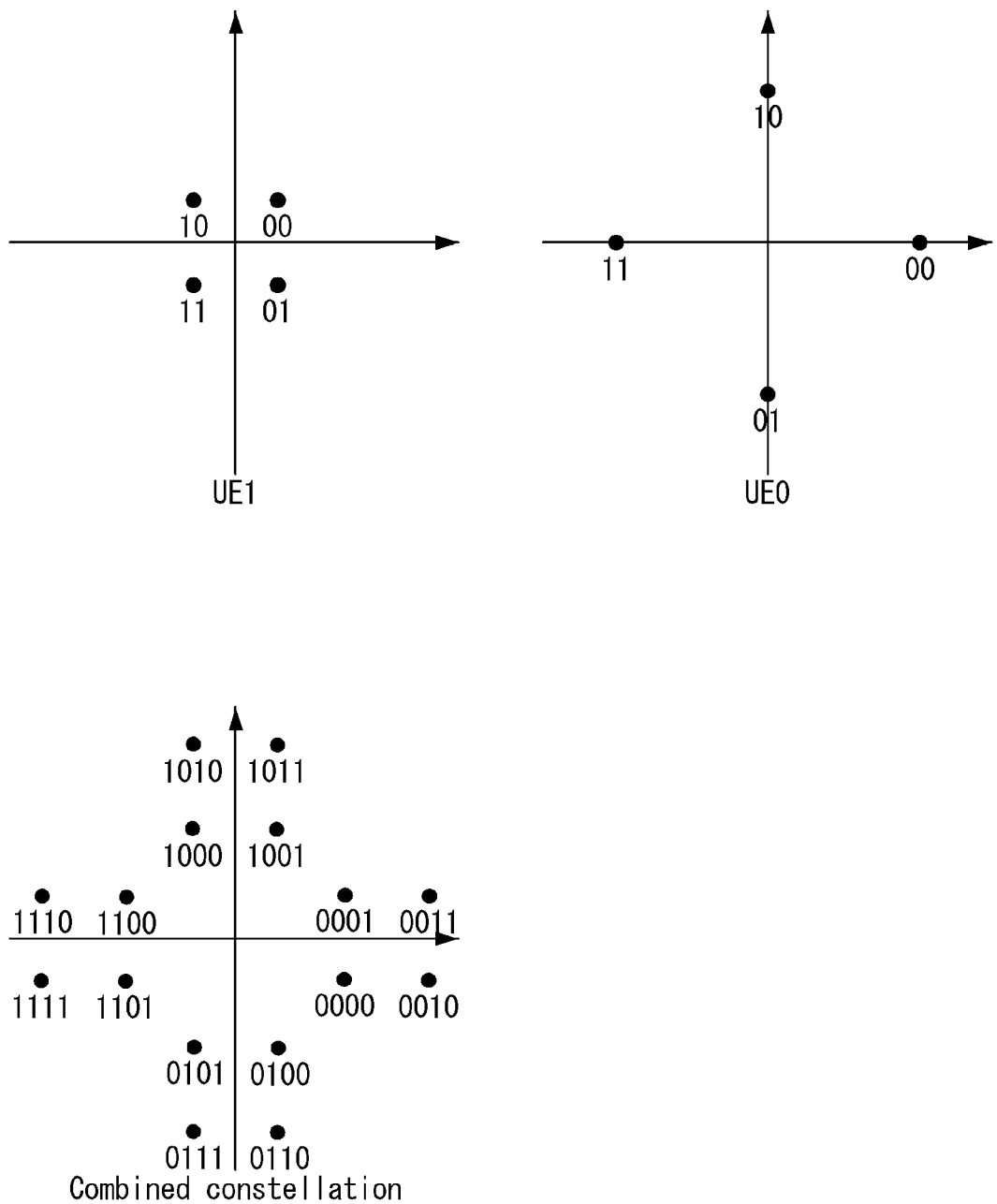
Combined constellation

[Figure 15]
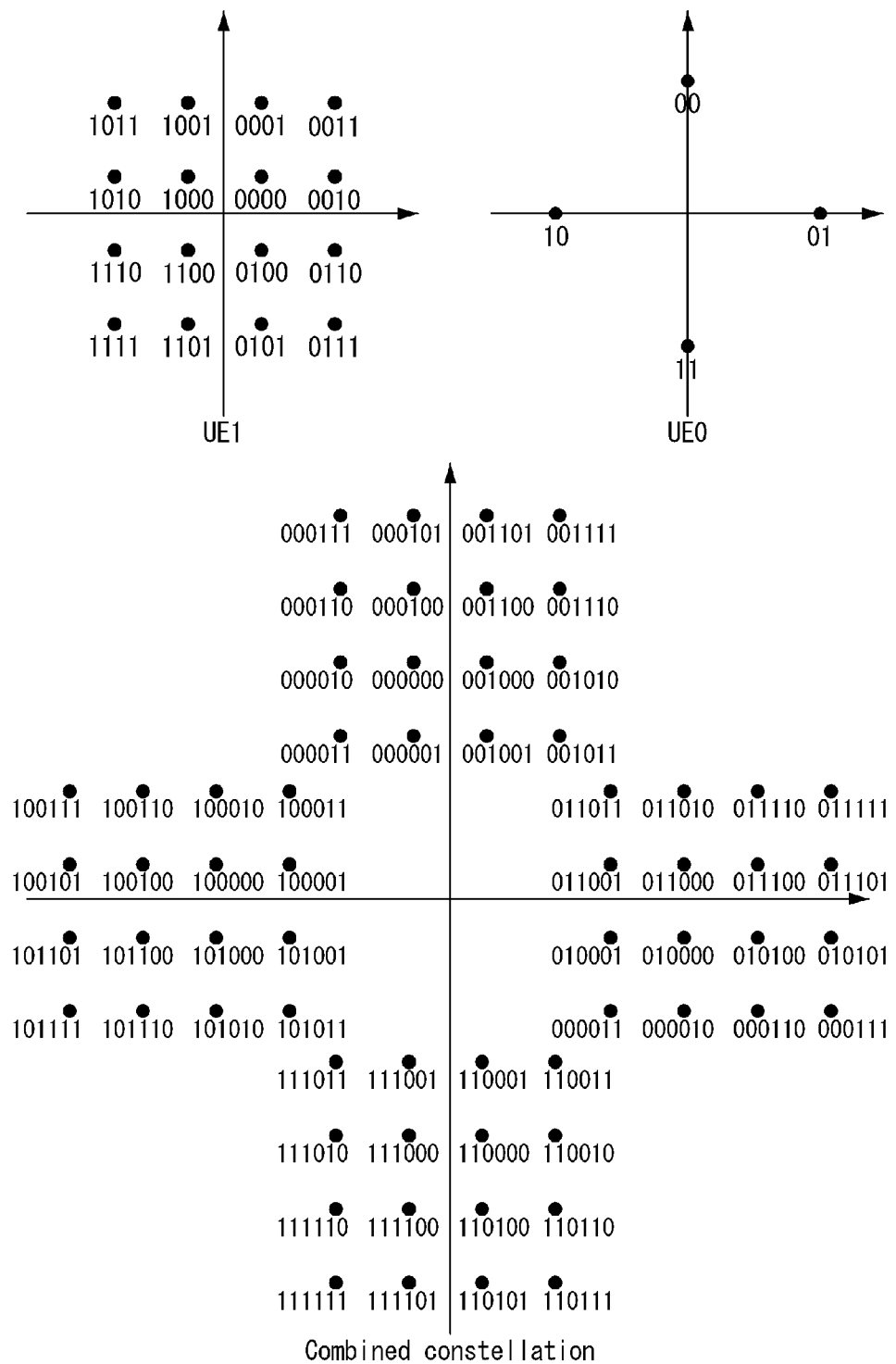
Combined constellation

[Figure 16]
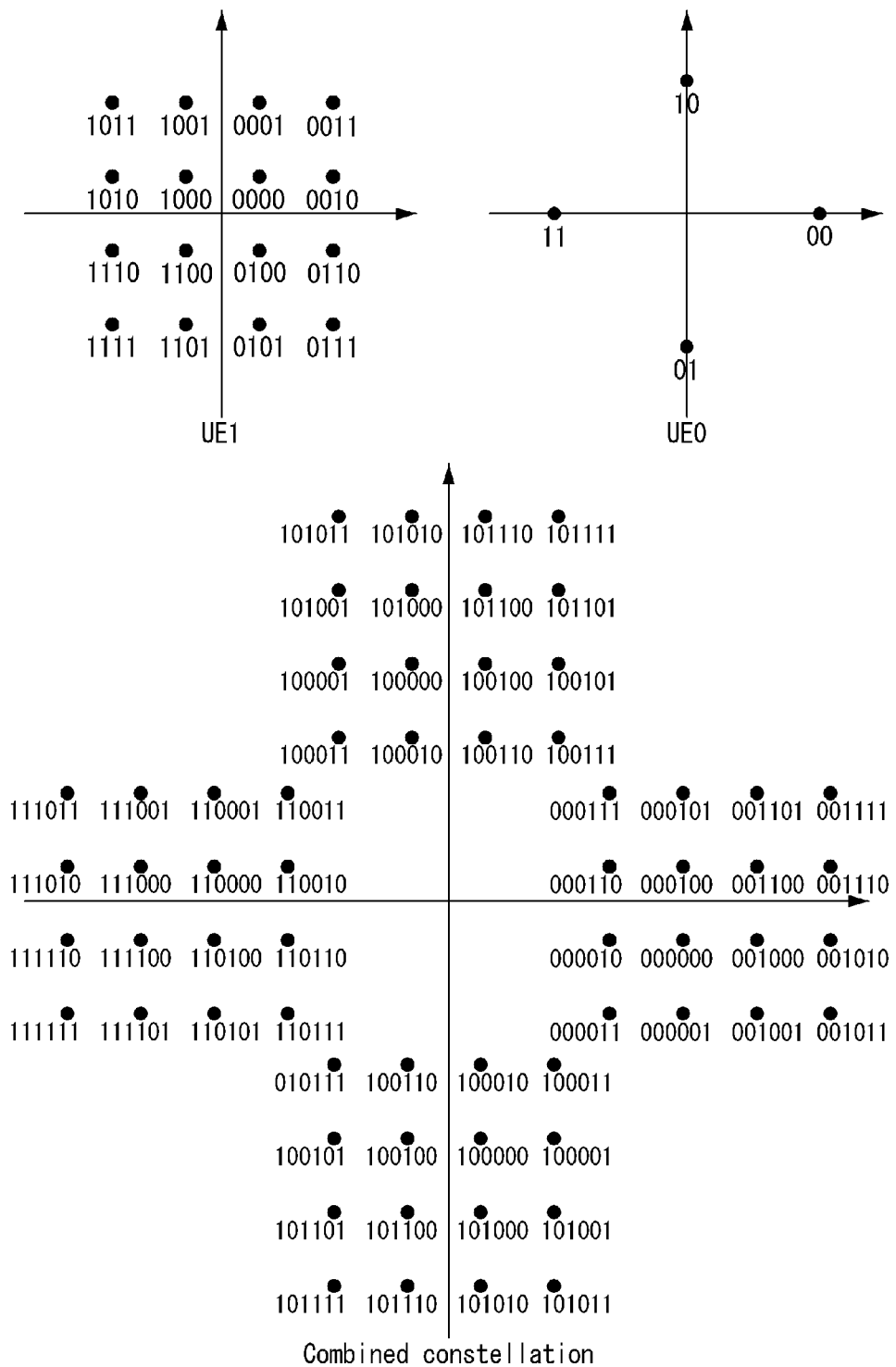
Combined constellation

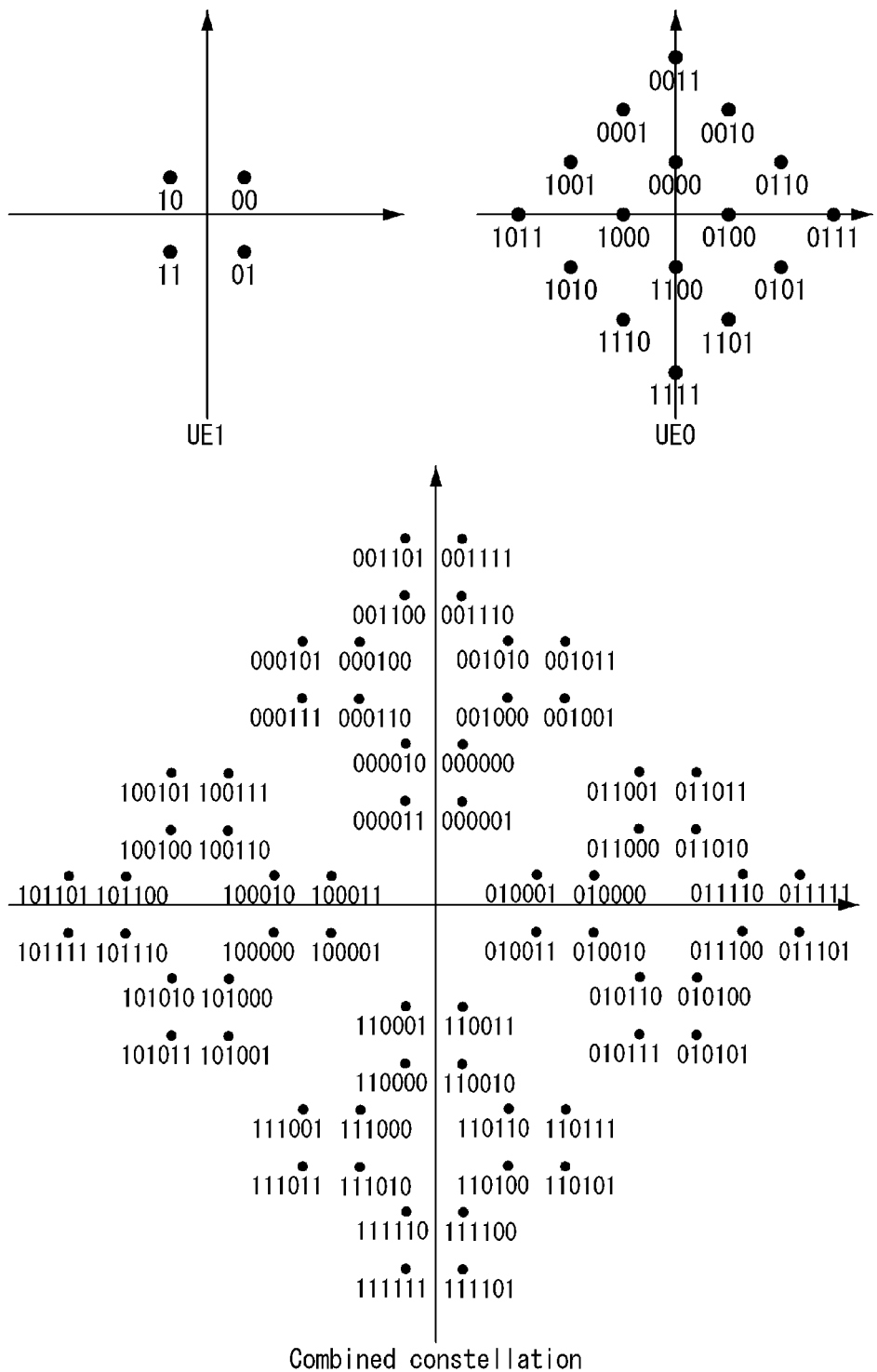
[Figure 17]
Combined constellation

[Figure 18]
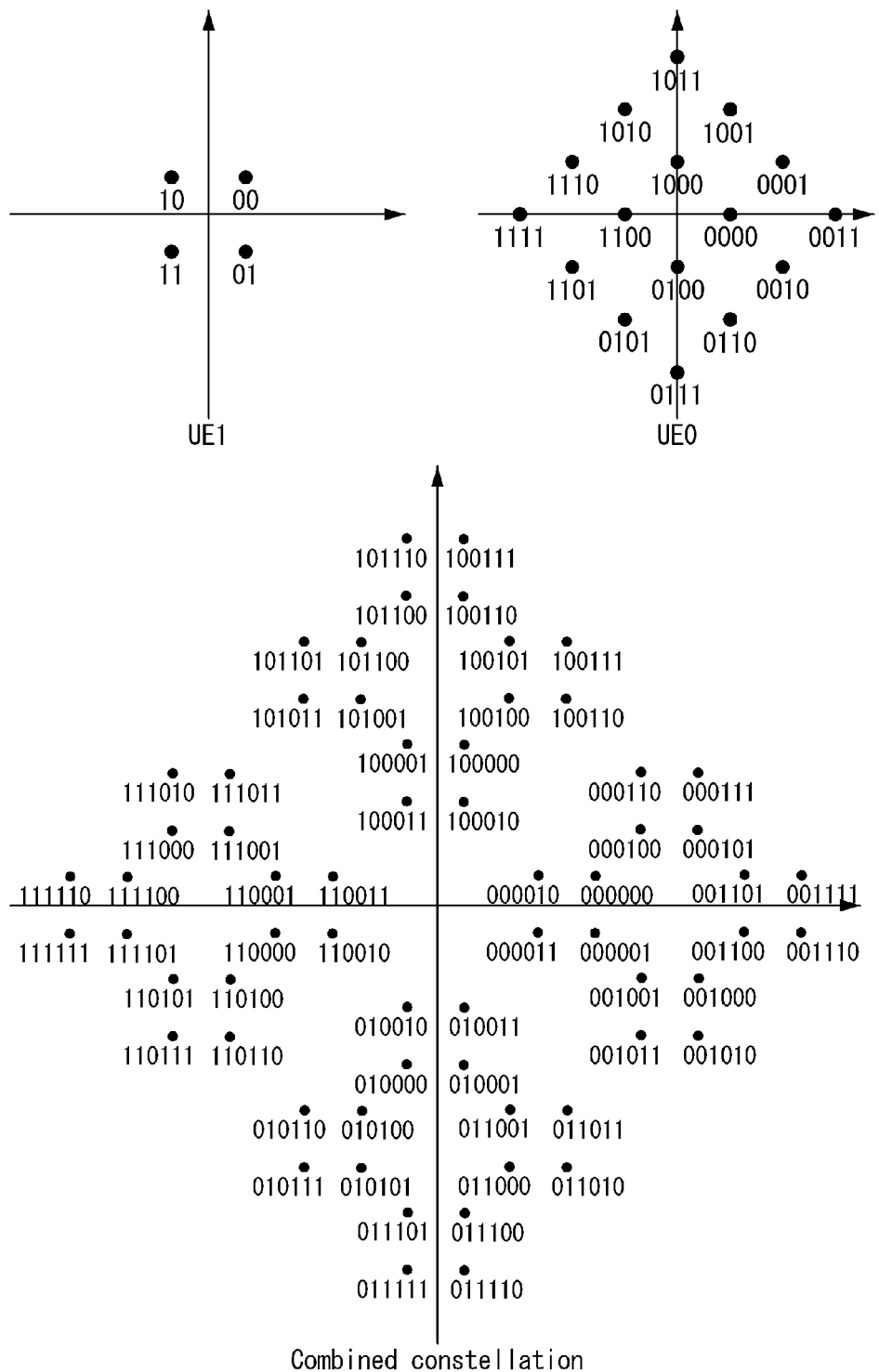
Combined constellation

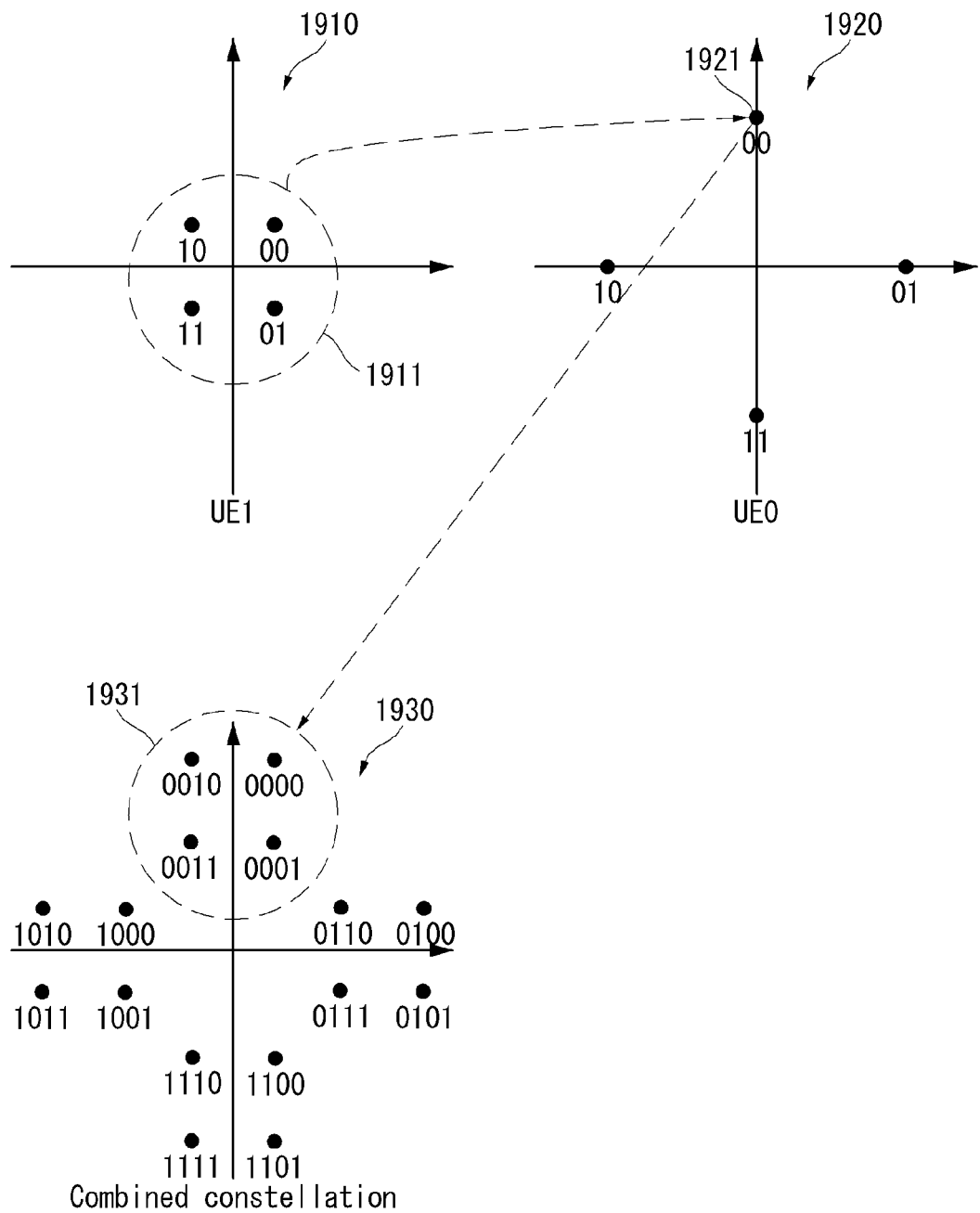

[Figure 20]
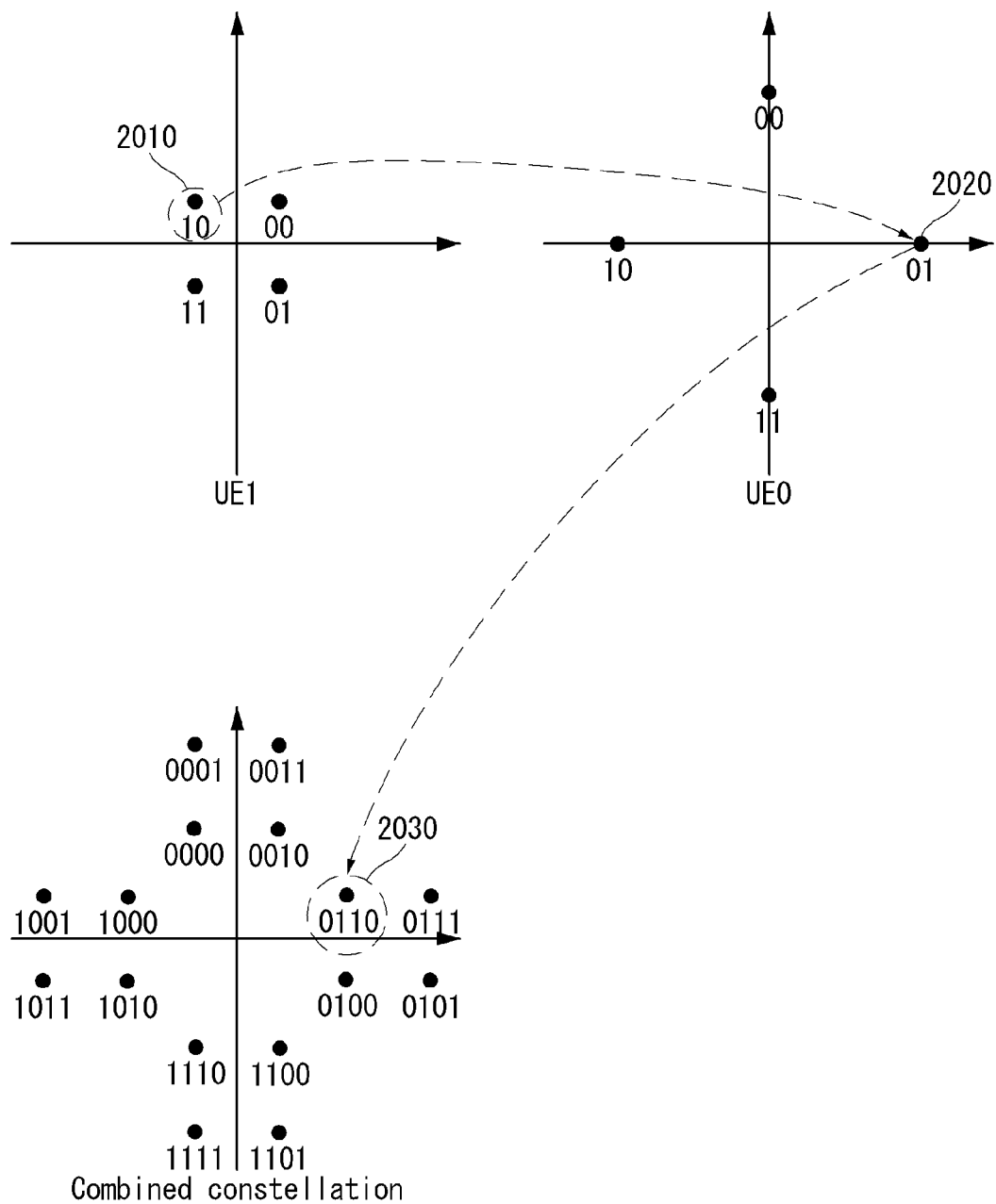
Combined constellation

[Figure 21]
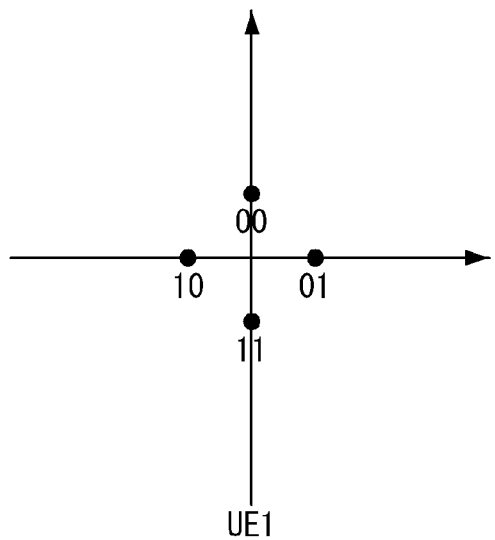
UE1
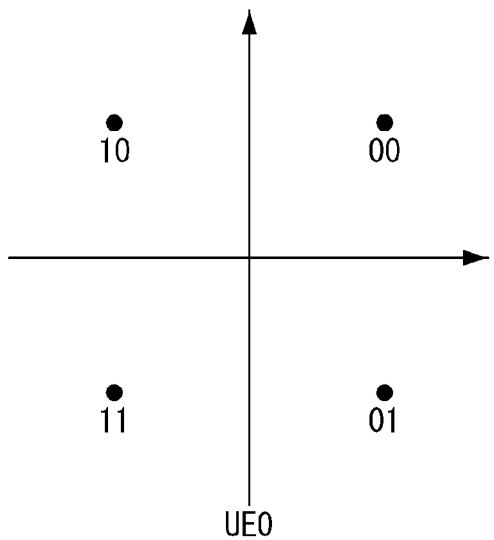
UE0
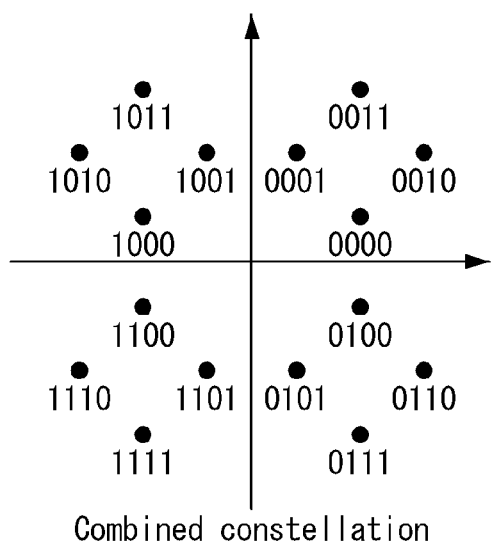
Combined constellation

[Figure 22]
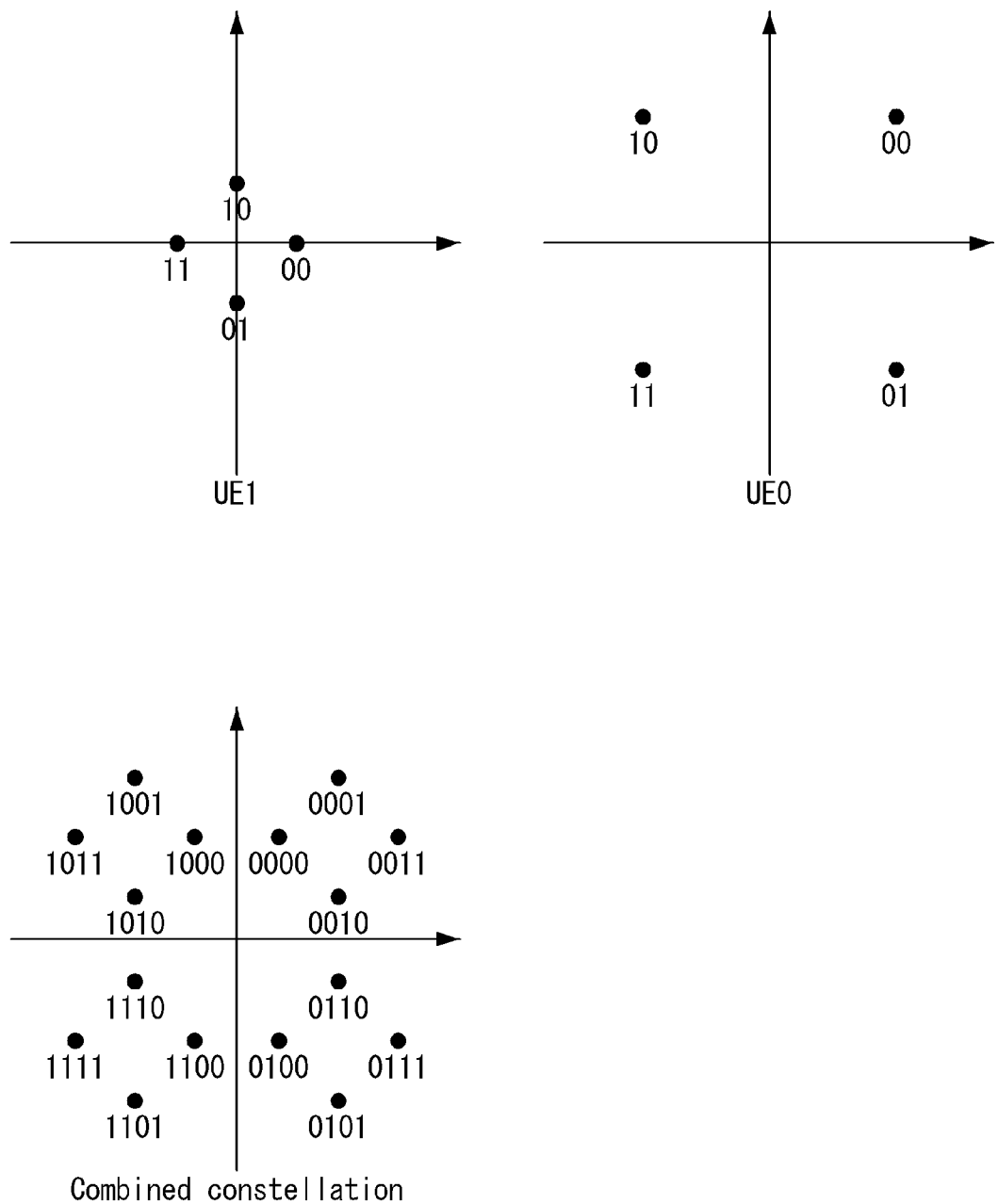
Combined constellation

【Figure 23】
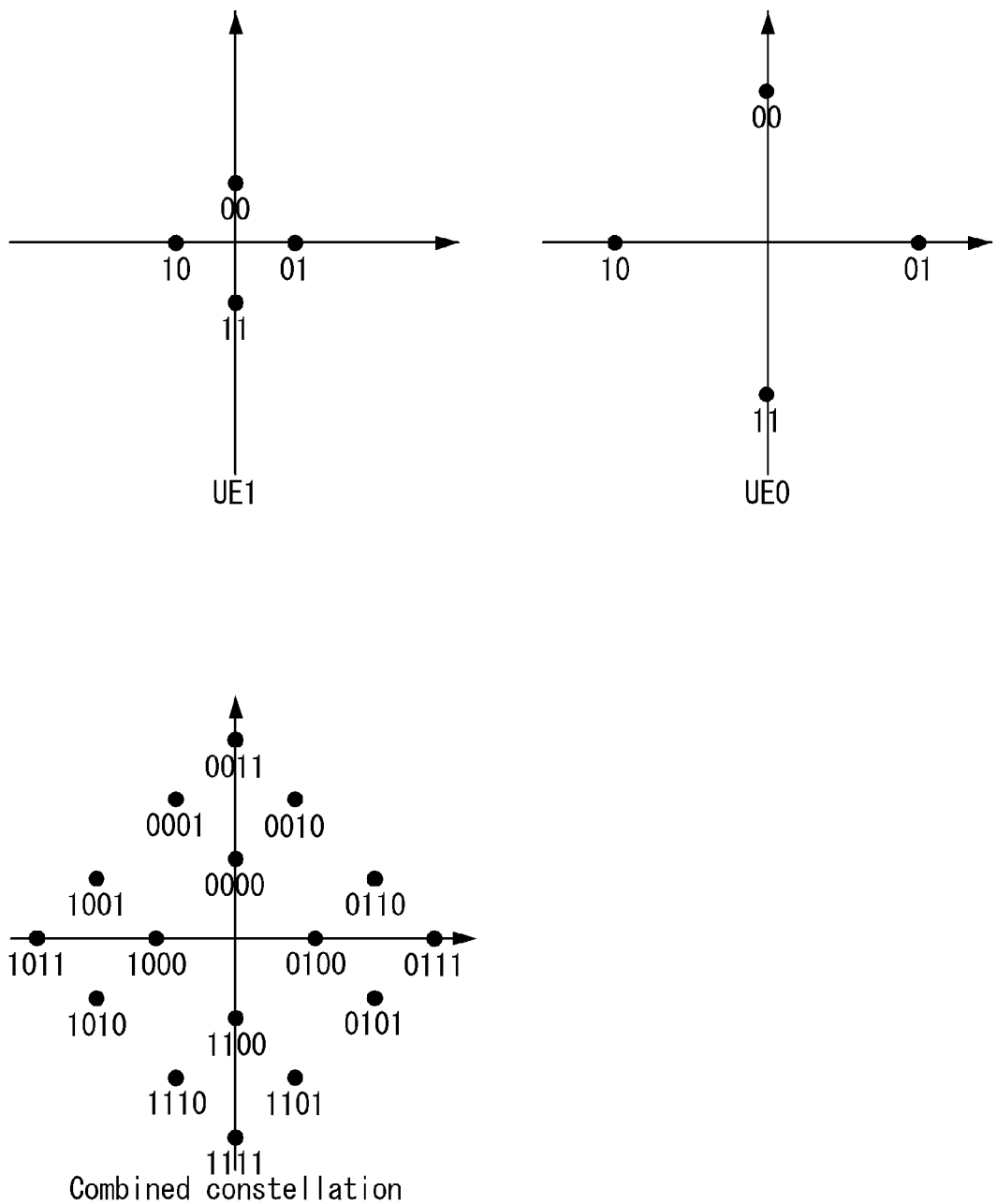

[Figure 24]
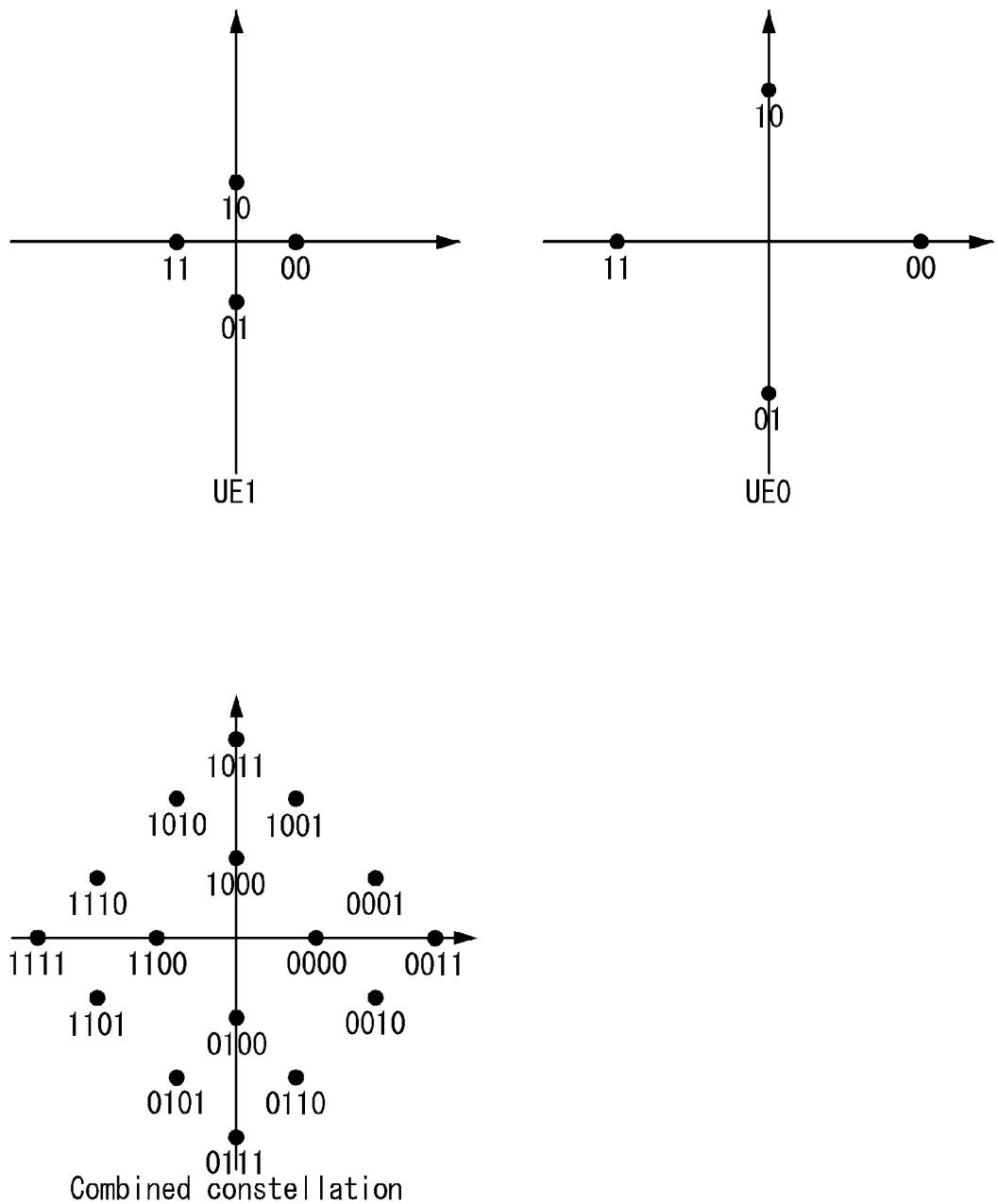
Combined constellation

【Figure 25】
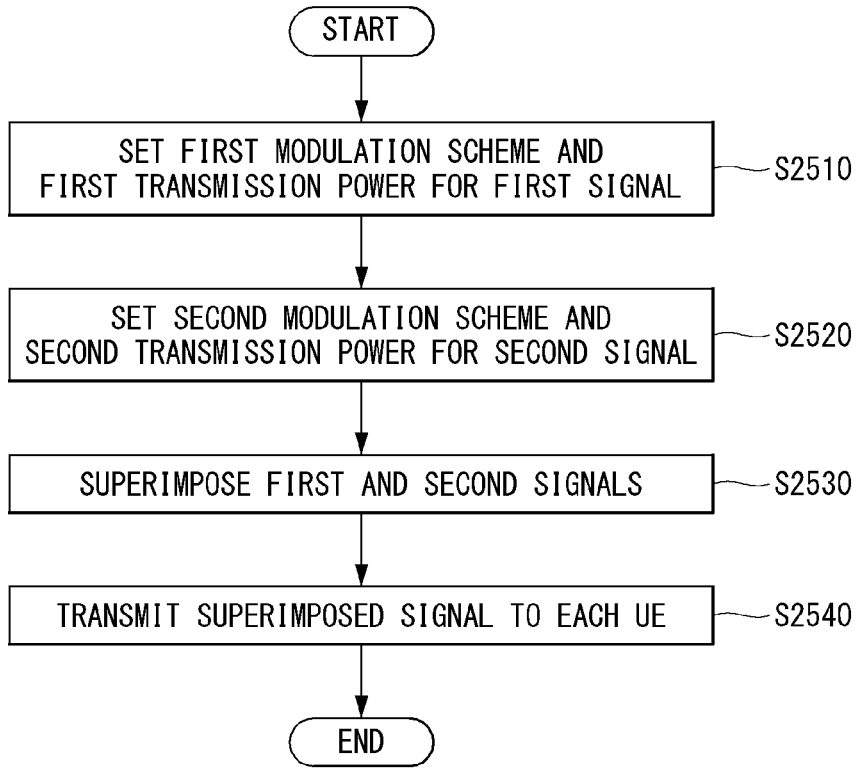
【Figure 26】
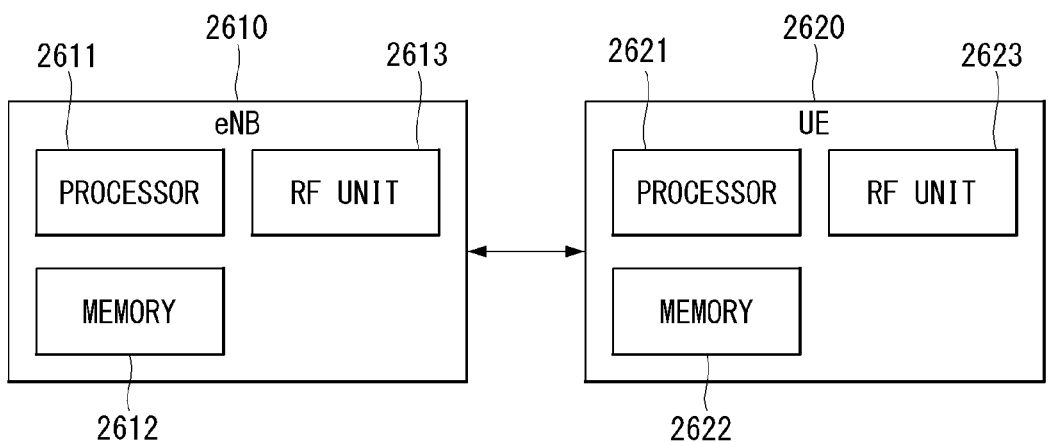

METHOD AND APPARATUS FOR TRANSMITTING AND RECEIVING SIGNAL USING NON-ORTHOGONAL MULTIPLE ACCESS IN WIRELESS COMMUNICATION SYSTEM

CROSS-REFERENCE TO RELATED APPLICATIONS

This application is the National Stage filing under 35 U.S.C. 371 of International Application No. PCT/KR2016/009894, filed on Sep. 5, 2016, which claims the benefit of U.S. Provisional Application No. 62/213,631, filed on Sep. 3, 2015, the contents of which are all hereby incorporated by reference herein in their entirety.

TECHNICAL FIELD

The present invention relates to a wireless communication system and, more particularly, to a method and apparatus for transmitting and receiving signals using non-orthogonal multiple access (NOMA).

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An aspect of the present invention provides a method for transmitting and receiving a signal using a hierarchical modulation (HM) method in a non-orthogonal multiple access (NOMA) method.

Another aspect of the present invention provides a method for configuring a superposed constellation related to transmission of a superposed signal of a near user equipment (UE) (NU) and a far UE (FU) in a NOMA system.

Another aspect of the present invention provides a method for an NU to transmit and receive information related to a configuration of a supposed constellation to decode a signal thereof in a received (superposed) signal in a NOMA system.

The technical problems solved by the present invention are not limited to the above technical problems and those skilled in the art may understand other technical problems from the following description.

Technical Solution

According to an aspect of the present invention, there is provided a method for transmitting and receiving signals by a base station (BS) using a non-orthogonal multiple access (NOMA) in a wireless communication system, including: setting a first modulation scheme and first transmission power for a first signal to be transmitted to a first user equipment (UE); setting a second modulation scheme and second transmission power for a second signal to be transmitted to a second UE; superimposing the first signal and the second signal; and transmitting the superimposed signal, wherein the superimposing of the first signal and the second signal includes configuring a superposed constellation using a first constellation based on the first modulation scheme and a second constellation based on the second modulation scheme; and combining a modulation symbol of the first signal and a modulation symbol of the second signal and mapping the same to the configured superposed constellation, wherein the superposed constellation is predefined in advance or configured by a predetermined notation.

Also, in this disclosure, the configured superposed constellation may be configured such that a difference between bit values regarding a bit sequence of adjacent points may be 1 bit or less.

Also, in this disclosure, the superposed constellation may be configured when a first precoding vector applied to the first UE and a second precoding vector applied to the second UE are different.

Also, in this disclosure, when a specific column of the first precoding vector and a specific column of the second precoding vector are not the same, the first precoding vector and the second precoding vector may be different.

Also, in this disclosure, the predefined superposed constellation may be configured by rotating at least one of the first constellation and the second constellation by a predetermined value.

Also, in this disclosure, the method may further include: transmitting control information related to cancellation of interference generated by the first signal to the first UE.

Also, in this disclosure, the control information may include at least one of the rotated predetermined value and a precoding vector index representing a precoding vector of the first UE and the second UE.

Also, in this disclosure, the predetermined notation may use a relation between a bit value constituting a bit sequence corresponding to the modulation symbol of the first signal and a bit value constituting a bit sequence corresponding to the modulation symbol of the second signal.

Also, in this disclosure, the first transmission power may be set to be lower than the second transmission power.

Also, in this disclosure, a distance between the first terminal and the BS may be shorter than a distance between the second UE and the BS.

Also, in this disclosure, the first modulation scheme and the second modulation scheme may each be any one of QPSK, 16 QAM, and 64 QAM.

According to another aspect of the present invention, there is provided a base station (BS) for transmitting and receiving data using a non-orthogonal multiple access (NOMA) in a wireless communication system, including: a radio frequency (RF) unit transmitting and receiving a radio signal; and a processor functionally connected to the RF unit, wherein the processor performs control to set a first modulation scheme and first transmission power for a first signal to be transmitted to a first user equipment (UE), set a second modulation scheme and second transmission power for a second signal to be transmitted to a second UE, superimpose the first signal and the second signal, and transmit the superimposed signal, wherein the processor performs control to configure a superposed constellation using a first constellation based on the first modulation scheme and a second constellation based on the second modulation scheme, and combine a modulation symbol of the first signal and a modulation symbol of the second signal and map the same to the configured superposed constellation to thereby superimpose the first signal and the second signal, and the superposed constellation is predefined in advance or configured by a predetermined notation.

Advantageous Effects

In this disclosure, a superposed constellation that may be applied to even a case in which each UE uses different precoding vectors is predefined or configured according to a predetermined notation, whereby a difference in bit value between adjacent points in the corresponding superposed constellation may be reduced to 1 bit or less.

Therefore, the NU may have increased decoding performance regarding the received (superposed) signal using the superposed constellation.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

FIG. 1 is a view illustrating an example of an evolved universal terrestrial radio access network (E-UTRAN) to which the present invention may be applied.

FIG. 2 is a view illustrating physical channels used in a 3GPP LTE/LTE-A system to which the present invention is applicable and a general signal transmitting method using the same.

FIG. 3 is a view illustrating a structure of a radio frame in a wireless communication system to which the present invention may be applied.

FIG. 4 is a view illustrating a resource grid for a downlink slot in a wireless communication system to which the present invention may be applied.

FIG. 5 is a view illustrating a structure of a downlink subframe in a wireless communication system to which the present invention may be applied.

FIG. 6 is a view illustrating the structure of an uplink subframe in a wireless communication system to which the present invention may be applied.

FIG. 7 is a conceptual view of an interference cancellation method used in a non-orthogonal multiple access (NOMA) system to which a method proposed in this disclosure may be applied.

FIG. 8 is a conceptual view illustrating an example of a downlink power control method.

FIG. 9 is a conceptual view illustrating an example of hierarchical modulation.

FIG. 10 is a view illustrating a basic concept of codebook-based precoding.

FIG. 11 is a view illustrating an example of a gray labeled constellation method when two UEs use the same precoding vector.

FIG. 12 is a view illustrating a bit-level gray converter to which the methods proposed in this disclosure may be applied.

FIG. 13 is a view illustrating an example of a predetermined superposed constellation proposed in the present disclosure.

FIG. 14 is a view illustrating another example of a predetermined superposed constellation proposed in the present disclosure.

FIG. 15 is a view illustrating another example of a predetermined superposed constellation proposed in the present disclosure.

FIG. 16 is a view illustrating another example of a predetermined superposed constellation proposed in the present disclosure.

FIG. 17 is a view illustrating another example of a predetermined superposed constellation proposed in the present disclosure.

FIG. 18 is a view illustrating another example of a predetermined superposed constellation proposed in the present disclosure.

FIG. 19 is a view illustrating an example of a superposed constellation generated by superposing constellations of respective terminals without applying a predetermined notation.

FIG. 20 is a view illustrating an example of a superposed constellation generated by superposing constellations of respective terminals by applying a predetermined notation proposed in the present disclosure.

FIGS. 21 and 22 illustrate other examples of a configuration of a superposed constellation proposed in the present disclosure.

FIGS. 23 and 24 illustrate examples of a superposed constellation when a constellation of each UE proposed in this disclosure rotates by a certain angle, respectively.

FIG. 25 is a flowchart illustrating an example of a method of transmitting and receiving signals in a NOMA system proposed in this disclosure.

FIG. 26 is a block view of a wireless communication apparatus to which the methods proposed in this disclosure may be applied.

BEST MODES

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are illustrated in block view form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS)', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

The embodiments of the present invention may be supported by standard documents disclosed for at least one of wireless access systems, Institute of Electrical and Electronics Engineers (IEEE) 802, 3rd Generation Partnership Project (3GPP), and 3GPP2. Steps or parts that are not described to clarify the technical features of the present invention may be supported by those documents. Further, all terms as set forth herein may be explained by the standard documents.

For clarity, this application focuses on the 3GPP LTE/LTE-A system. However, the technical features of the present invention are not limited thereto.

General System

FIG. 1 is a view illustrating an example of an evolved universal terrestrial radio access network (E-UTRAN) to which the present invention may be applied.

The E-UTRAN system is an evolved version of the existing UTRAN system and may be, for example, a 3GPP LTE/LTE-A system. The E-UTRAN consists of eNBs providing a user plane and control plane protocol to a UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbor eNBs. The X2-CP performs functions such as context transfer between eNBs, control of user plane tunnels between source eNB and target eNB, transfer of handover related messages, uplink load management, and the like. An eNB is connected to a UE through a radio interface and is connected to an Evolved Packet Core (EPC) through an S1 interface. The S1 user plane interface (S1-U) is defined between the eNB and a serving gateway (S-GW). The S1 control plane interface (S1-MME) is defined between the eNB and a MME (Mobility Management Entity). The S1 interface performs functions such as EPS (Enhanced Packet System) Bearer Service Management function, NAS (Non-Access Stratum) Signaling Transport function, Network Sharing Function, MME Load balancing Function, and the like. The S1 interface supports a many-to-many relation between the eNB and the MME/S-GW.

FIG. 2 is a view illustrating physical channels used in a 3GPP LTE/LTE-A system to which the present invention may be applied and a general signal transmitting method using the same.

When a power in an OFF state is turned on again or when a UE newly enters a cell, the terminal performs an initial cell search operation such as adjusting synchronization with an eNB, or the like, in step S201. To this end, the UE receives a primary synchronization channel (P-SCH) and a secondary synchronization channel (S-SCH) from the eNB to adjust synchronization with the eNB and obtains information such as a cell ID, or the like.

Thereafter, the UE may receive a physical broadcast signal (PBCH) signal from the eNB to obtain intra-cell broadcast information. Meanwhile, the UE may receive a downlink reference signal (DL RS) in an initial cell discovery stage to check a downlink channel state.

When finishing the initial cell discovery, the UE may receive a PDCCH and a PDSCH according to the PDCCH to obtain more specific system information in step S202.

Thereafter, in order to complete connection to the eNB, the UE may perform a random access procedure as that in steps S203 to S206. To this end, the UE may transmit a preamble via a physical random access channel (PRACH) (S203) and receive a response message regarding the preamble via the PDCCH and the PDSCH corresponding thereto (S204). In the case of a contention-based random access, the UE may perform a contention resolution procedure such as transmitting an additional PRACH signal (S205) and receiving a PDCCH signal and a PDSCH signal corresponding thereto (S206).

After performing the aforementioned procedure, the UE may receive a PDCCH signal and/or a PDSCH signal (S207) and transmit a PUSCH signal and/or a PUCCH signal in a general uplink/downlink signal transmission procedure.

Control information transmitted by the UE to the eNB is generally referred to as uplink control information (UCI). The UCI includes HARQ (Hybrid Automatic Retransmit request)-ACK (Acknowledge)/NACK (Non-Acknowledge), a scheduling request (SR), a Channel Quality Indicator (CQI), a precoding matrix indicator (PMI), rank indication (RI) information, and the like.

In the LTE/LTE-A system, the UCI is periodically transmitted via a PUCCH. However, in a case in which control information and traffic data are to be transmitted simultaneously, the UCI may be transmitted via a PUCCH. Also, the UCI may be aperiodically transmitted via a PUSCH according to a request/indication from/by a network.

FIG. 3 illustrates a structure of a radio frame in a wireless communication system to which the present invention may be applied. 3GPP LTE/LTE-A support a radio frame structure type 1 which may be applicable to Frequency Division Duplex (FDD) and a radio frame structure which may be applicable to Time Division Duplex (TDD).

FIG. 3(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 3(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

The structure of the radio frame is only one example. The number of subcarriers included in a radio frame or the number of slots included in a subframe and the number of OFDM symbols included in a slot may be changed in various ways.

FIG. 4 is a view illustrating a resource grid for one downlink slot in the wireless communication system to which the present invention may be applied.

Referring to FIG. 4, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 5 illustrates a structure of a downlink subframe in the wireless communication system to which the present invention may be applied.

Referring to FIG. 5, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 6 illustrates a structure of an uplink subframe in the wireless communication system to which the present invention may be applied.

Referring to FIG. 6, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

General Non-Orthogonal Multiple Access (NOMA)

Non-orthogonal multiple access (NOMA) refers to a multi-access scheme capable of obtaining high bandwidth efficiency by allocating a plurality of UEs to the same frequency-time resources with an additionally previously considered power ratio and alleviating a previously considered inter-user interference through an interference cancelation receiver, compared with a scheme of allocating resource in a frequency-time domain basically under the premise of an interference canceller.

The NOMA, a new wireless access technology, is addressed as an important candidate technology for future 5G systems.

FIG. 7 is a conceptual view of an interference cancellation method used in a NOMA system to which a method proposed in this disclosure may be applied.

As illustrated in FIG. 7, an important configuration technique of the NOMA system may be classified into (1) a method of allocating resource of a base station and (2) a method of canceling interference of a terminal (or a UE).

Here, the method of canceling interference of a UE may include various forms such as 1) a symbol-level IC (Interference Cancellation) receiver, 2) an ML (Maximum likelihood) receiver, 3) a symbol-level IC (Interference Cancellation) receiver, 4) CWIC (Codeword level interference cancellation) receiver, 5) an L-CWIC (MMSE based Linear CWIC), and 6) ML-CWIC.

According to each interference cancellation technique, a reception gain of the UE differs in a given environment. Generally, a gain is significantly increased when the ML scheme is applied in proportion to UE implementation complexity and in the CWIC type receiver.

Downlink Power Control

In a wireless communication system such as 3GPP LTE (-A), an energy per resource element (EPRE), which is an energy value for each resource element, is defined for power allocation of downlink resources.

Here, a reference value is an EPRE for a cell-specific reference signal (CRE), and the CRS EPRE is determined as a higher layer signal to have a fixed value in downlink system bandwidth and a subframe.

In the LTE(-A) system, the EPRE for the resources of a physical data shared channel (PDSCH) in which actual data is transmitted may be expressed as a predetermined ratio of the CRS EPRE.

For example, in an orthogonal frequency division modulation (OFDM) symbol without the CRS, a ratio of the CRS EPRE to the PDSCH EPRE is defined as $\rho_A$, and, in an OFDM symbol with the CRS, a ratio of CSR EPRE to the PDSCH EPRE is defined as $\rho_B$.

FIG. 8 is a conceptual view illustrating an example of a downlink power control method.

In FIG. 8, the horizontal axis represents OFDM symbol and the vertical axis represents power for increasing subcarrier.

In FIG. 8, $\rho_A$ is determined according to a power offset $\delta_{power-offset}$ depending on whether a multiple input multiple output (MIMO) is applied and a UE-specific variable $P_A$, and $\rho_A/\rho_B$ is determined according to the number of antenna ports and a cell-specific variable $P_B$.

In the current LTE system (i.e., Rel-10), $\rho_A$ is defined to be different in two different cases.

First, in the case of PDSCH data transmission using a transmission diversity scheme utilizing four cell common antenna ports, $\rho_A$ is determined by Equation 1 below.

$$\rho_A = \delta_{power-offset} + P_A + 10 \log_{10} 2 \text{ [dB]} \qquad \text{[Equation 1]}$$

Here, $\delta_{power-offset}$ denotes a power offset value for supporting an MU-MIMO operation and is set to 0 dB in other PDSCH transmission.

Also, $P_A$ denotes the UE-specific variables as described above.

In otherwise cases, excluding the diversity-based PDSCH transmission mentioned above, $\rho_A$ is defined as expressed in Equation 2 below.

$$\rho_A = \delta_{power-offset} + P_A \text{ [dB]} \qquad \text{[Equation 2]}$$

Hierarchical Modulation

FIG. 9 is a conceptual view illustrating an example of hierarchical modulation.

Hierarchical modulation (HM) will be briefly described with reference to FIG. 9.

HM may be called or expressed as layered modulation.

HM is one of the techniques for multiplexing and modulating multiple data streams into one symbol stream.

Here, base-layer subsymbols and enhancement-layer subsymbols are superimposed in synchronization with each other before transmission.

When HM is applied, a user or user terminal with a good reception and enhanced receiver may demodulate and decode more than one data stream.

An existing receiver or a user terminal having poor reception may demodulate and decode only a data stream transmitted in a low layer (e.g., a base layer).

From an information-theory point of view, HM is treated as one practical implementation in superposed precoding and has been proposed to achieve a maximum sum rate of a Gaussian broadcast channel with successful interference cancellation at a receiver.

In terms of network operation, a network operator may seamlessly target user terminals with different services or QoS when HM is applied. However, in existing hierarchical modulation, due to inter-layer interference (ILI), a ratio which may be achieved by low-layer data streams (e.g. the base layer data stream) is reduced due to interference from higher layer signal(s).

For example, for hierarchically modulated two-layer symbols including a 16 QAM base layer and a QPSK enhancement layer, loss of base-layer throughput due to inter-layer interference may be increased to up to about 1.5 bits/symbol when the overall reception SNR (signal-to-noise ratio) is about 23 dB.

This means that loss of the achievable throughput of the base-layer in 23 dB SNR is about 37.5% (1.5/4).

On the other hand, a demodulation error rate of either base-layer or enhancement-layer symbols is also increased.

Codebook-based Precoding Technique

In order to support multi-antenna transmission, precoding to appropriately distributes transmission information to each antenna according to a channel condition, or the like, may be applied.

A codebook-based precoding technique refers to a technique in which a set of precoding matrices is predetermined in a transmitter and a receiver, and the receiver (e.g., a terminal) measures channel information from the transmitter (e.g., a base station (BS)) and feeds back the most appropriate precoding matrix (i.e., a precoding matrix index (PMI)) to the transmitter, and the transmitter then applies appropriate precoding to signal transmission on the basis of the PMI.

Since it is a method of selecting an appropriate precoding matrix from a predetermined precoding matrix set, optimal precoding is not always applied but feedback overhead may be advantageously reduced, compared with explicitly feeding back optimal precoding information to actual channel information.

FIG. 10 is a view illustrating a basic concept of codebook-based precoding.

According to the codebook-based precoding scheme, the transmitter and the receiver share codebook information including a predetermined number of precoding matrices previously determined according to a transmission rank, the number of antennas, and the like. That is, if the feedback information is finite, the precoding-based codebook scheme may be used. The receiver may measure a channel state through a received signal and feed back a finite number of preferred precoding matrix information (i.e., the index of the corresponding precoding matrix) to the transmitter based on the aforementioned codebook information. For example, the receiver may select an optimal precoding matrix by measuring a received signal using ML (Maximum Likelihood) or MMSE (Minimum Mean Square Error) method. In FIG. 10, it is illustrated that the receiver transmits precoding matrix information to the transmitter by codewords. However, the present invention is not limited thereto.

Upon receiving the feedback information from the receiver, the transmitter may select a specific precoding matrix from the codebook based on the received information. The transmitter, upon selecting the precoding matrix, performs precoding by multiplying the selected precoding matrix to the number of layer signals corresponding to a transmission rank, and may transmit the precoded transmission signal to the receiver through a plurality of antennas. The number of rows in the precoding matrix is equal to the number of antennas, and the number of columns is equal to the rank value.

Since the rank value is equal to the number of layers, the number of columns is equal to the number of layers. For example, if the number of transmit antennas is 4 and the number of transmission layers is 2, the precoding matrix may be composed of a 4×2 matrix. Information transmitted through each layer through the precoding matrix may be mapped to each antenna.

The receiver, upon receiving the precoded signal transmitted from the transmitter, may recover the received signal by performing a reverse process of the precoding performed by the transmitter. In general, the precoding matrix satisfies a unitary matrix U condition such as $U*UH=1$, and thus, the reverse process of the precoding as described above may be performed by multiplying a Hermit matrix (PH) of the precoding matrix P used for precoding of the transmitter to the received signal.

For example, Table 1 below illustrates a codebook used for downlink transmission using two transmit antennas in the 3GPP LTE Release-8/9, and Table 2 below illustrates a codebook used for downlink transmission using four transmit antennas in the 3GPP LTE Release-8/9.

TABLE 1

| Codebook | Number of layers $v$ | |
|---|---|---|
| Index | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers $v$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2 above, $W_n^{\{s\}}$ is obtained as a set $\{s\}$ configured from a formula expressed as $W_n = I - 2u_n u_n^H/u_n^H u_n$.

Here, I represents a 4×4 single matrix and $u_n$ is a value given in Table 2.

As illustrated in Table 1, a codebook for two transmit antennas has a total of seven precoding vectors/matrices, and here, since a single matrix is for an open-loop system, precoding vectors/matrices for precoding of the closed-loop system totals 6.

Also, a codebook for four transmit antennas has a total of 64 precoding vectors/matrices.

The above codebook has a common characteristic such as a constant modulus (CM) characteristic, nested property, a constrained alphabet, and the like. The CM characteristic is a characteristic that each element of all the precoding matrices in the codebook does not include '0' and is configured to have the same size.

The nested property refers to that a low-rank precoding matrix is designed to be configured as a subset of a specific column of a high-rank precoding matrix. The constrained alphabet characteristic refers to a characteristic that the alphabet of each element of all the precoding matrices in the codebook is configured as $$\left\{\pm 1, \pm j, \pm \frac{(1ij)}{\sqrt{2}}, \pm \frac{(1ij)}{\sqrt{2}}\right\}.$$

Hereinafter, a method of configuring bit values between adjacent points to be different only by 1 bit in a superposed constellation when performing modulation combining of each UE when a near UE (NU) and a far UE (FU) use different numbers of layer in the NOMA system proposed in this disclosure will be described. Hereinafter, the method of configuring bit values between adjacent points to be different only by 1 bit in the superposed constellation will be referred to as a 'gray labeled constellation method'.

In other words, the gray labeled constellation method refers to a method of configuring a constellation such that a bit sequence constituting adjacent modulation symbols is different only by 1 bit in a superposed constellation in order to minimize a bit-unit error In particular, the present disclosure proposes a gray labeled constellation method using rotation of a constellation of any one UE or constellations of two UEs. In order to distinguish the gray labeled constellation method of the present disclosure from the conventional gray labeled constellation method, the conventional gray labeled constellation method will be referred to as a 'conventional enhanced-gray labeled constellation method'.

First, the NOMA system uses a superposition coding scheme to transmit information to different UEs (NU and FU) using the same time and frequency resources.

That is, the BS implements a superposed constellation by superposing a constellation according to a modulation order to be applied to a signal for a UE1 (near UE (NU)) having a good geometry and a constellation according to a modulation order to be applied to a signal for a UE0 (far UE (FU)) having a poor geometry.

Here, in case where the constellation defined by the existing 3GPP specification is superimposed on the constellations of the respective UEs are superposed by adjusting only a power allocation factor in a constellation defined in the conventional 3GPP specification, a difference in bit value between adjacent points (or adjacent signals) in the superposed constellation is made by 2 bits or greater.

Thus, when the difference in bit value between the adjacent points in the superposed constellation is 2 bits or greater, it may cause a significant performance degradation in using a specific receiver (e.g., ML receiver).

The problem of performance degradation may be solved by the conventional gray labeled constellation method in which a difference in bit value between adjacent points of superposed constellation is set to be different only by 1 bit using a simple logic circuit when the constellations defined in the existing 3GPP specification are superposed.

However, performance of the conventional gray labeled constellation method is guaranteed only when different UEs use the same precoding vector.

That is, when the precoding vectors used by the UEs are different from each other, the conventional gray labeled constellation method has a limitation.

Accordingly, The present disclosure proposes a new gray labeled constellation method for configuring a bit value between adjacent points in a superposed constellation to be different only by 1 bit when precoding vectors to be used by different UEs are different, that is, an enhanced gray labeled constellation.

The new gray labeled constellation method proposed in this disclosure is (1) a method (method 1) of configuring a superposed constellation by rotating a constellation of any one UE to be superposed on a constellation of another UE and (2) a method (method 2) of configuring a superposed constellation by superposing constellations of respective UEs based on a predetermined notation. As discussed above, precoding vectors used precoding and CSI reporting through an antenna port {0, 1} are illustrated in Table 3 below.

Table 3 illustrates precoding vectors according to the number of layers. This is the same as Table 1 above.

TABLE 3

| Codebook index | Number of layers $\upsilon$ | |  |
|---|---|---|---|
|  | 1 | 2 |  |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ | For Open-Loop |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ | For Closed-Loop |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ | For Closed-Loop |
| 3 | $\frac{1}{\sqrt{2}}\begin{bmatrix}1\\-j\end{bmatrix}$ | — |  |

Referring to Table 3, if the number of layers is one, four precoding vectors from codebook indices 0 to 3 are used.

If the number of layers is two, precoding vectors of the codebook indices 1 and 2 are used for a closed loop and precoding vectors of the codebook index 0 is used for an open loop.

Since it is basically assumed that the NU and the FU in the NOMA system use the same precoding vector, if the numbers of layers used by the NU and the FU are the same, the conventional gray labeled constellation method may be used.

However, if the numbers of layers used by the NU and the FU are different, precoding vectors used by each UE may be varied, generating matters to be additionally considered.

For example, in a closed-loop feedback environment, it is assumed that the NU uses two layers and the FU uses one layer.

Here, the NU may use one of precoding vectors $$\frac{1}{2}\begin{bmatrix}1&1\\1&-1\end{bmatrix} \text{ and } \frac{1}{2}\begin{bmatrix}1&1\\j&-j\end{bmatrix},$$

and the FU may use one of precoding vectors $$\frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \text{ and } \frac{1}{\sqrt{2}}\begin{bmatrix}1\\-j\end{bmatrix}.$$

A total number of cases that may be obtained by combining the above precoding vectors is 8, and this may be summarized as illustrated in Table 4 below.

That is, Table 4 illustrates an example of eight combinations that may be obtained according to the above precoding vectors.

TABLE 4

| case | NU Codebook index | NU Precoding vector | FU Codebook index | FU Precoding vector | Remark |
|---|---|---|---|---|---|
| 1 | 1 | $\frac{1}{2}\begin{bmatrix}1 & 1\\1 & -1\end{bmatrix}$ | 0 | $\frac{1}{\sqrt{2}}\begin{bmatrix}1\\1\end{bmatrix}$ | Same precoding vector |
| 2 | | | 1 | $\frac{1}{\sqrt{2}}\begin{bmatrix}1\\-1\end{bmatrix}$ | |
| 3 | | | 2 | $\frac{1}{\sqrt{2}}\begin{bmatrix}1\\j\end{bmatrix}$ | Different precoding vector |
| 4 | | | 3 | $\frac{1}{\sqrt{2}}\begin{bmatrix}1\\-j\end{bmatrix}$ | |
| 5 | 2 | $\frac{1}{2}\begin{bmatrix}1 & 1\\j & -j\end{bmatrix}$ | 0 | $\frac{1}{\sqrt{2}}\begin{bmatrix}1\\1\end{bmatrix}$ | Different precoding vector |
| 6 | | | 1 | $\frac{1}{\sqrt{2}}\begin{bmatrix}1\\-1\end{bmatrix}$ | |
| 7 | | | 2 | $\frac{1}{\sqrt{2}}\begin{bmatrix}1\\j\end{bmatrix}$ | Same precoding vector |
| 8 | | | 3 | $\frac{1}{\sqrt{2}}\begin{bmatrix}1\\-j\end{bmatrix}$ | |

In Table 4, cases 1, 2, 7, and 8 are the same as the case of using the same precoding vector and the reason can be known from Equation 3 to Equation 6 below.

First, in Table 4, case 1 may be expressed by Equation 3 below.

$$\begin{bmatrix}h_1 & h_2\\h_3 & h_4\end{bmatrix}\left(\frac{1}{2}\begin{bmatrix}1\\1\end{bmatrix}x_1 + \frac{1}{2}\begin{bmatrix}1\\-1\end{bmatrix}x_2 + \frac{1}{\sqrt{2}}\begin{bmatrix}1\\1\end{bmatrix}x_3\right) = \quad \text{[Equation]}$$
$$\begin{bmatrix}h_1 & h_2\\h_3 & h_4\end{bmatrix}\left(\frac{1}{2}\begin{bmatrix}1\\1\end{bmatrix}(x_1 + \sqrt{2}x_3) + \frac{1}{\sqrt{2}}\begin{bmatrix}1\\-1\end{bmatrix}(x_2)\right)$$

Next, in Table 4, case 2 may be expressed by Equation 4 below.

$$\begin{bmatrix}h_1 & h_2\\h_3 & h_4\end{bmatrix}\left(\frac{1}{2}\begin{bmatrix}1\\1\end{bmatrix}x_1 + \frac{1}{2}\begin{bmatrix}1\\-1\end{bmatrix}x_2 + \frac{1}{\sqrt{2}}\begin{bmatrix}1\\-1\end{bmatrix}x_3\right) = \quad \text{[Equation 4]}$$
$$\begin{bmatrix}h_1 & h_2\\h_3 & h_4\end{bmatrix}\left(\frac{1}{2}\begin{bmatrix}1\\1\end{bmatrix}(x_1) + \frac{1}{2}\begin{bmatrix}1\\-1\end{bmatrix}(x_2 + \sqrt{2}x_3)\right)$$

Next, in Table 4, case 7 may be expressed by Equation 5 below.

$$\begin{bmatrix}h_1 & h_2\\h_3 & h_4\end{bmatrix}\left(\frac{1}{2}\begin{bmatrix}1\\j\end{bmatrix}x_1 + \frac{1}{2}\begin{bmatrix}1\\-j\end{bmatrix}x_2 + \frac{1}{\sqrt{2}}\begin{bmatrix}1\\j\end{bmatrix}x_3\right) = \quad \text{[Equation 5]}$$
$$\begin{bmatrix}h_1 & h_2\\h_3 & h_4\end{bmatrix}\left(\frac{1}{2}\begin{bmatrix}1\\j\end{bmatrix}(x_1 + \sqrt{2}x_3) + \frac{1}{2}\begin{bmatrix}1\\-j\end{bmatrix}(x_2)\right)$$

Next, in Table 4, case 8 may be expressed by Equation 6 below.

$$\begin{bmatrix}h_1 & h_2\\h_3 & h_4\end{bmatrix}\left(\frac{1}{2}\begin{bmatrix}1\\j\end{bmatrix}x_1 + \frac{1}{2}\begin{bmatrix}1\\-j\end{bmatrix}x_2 + \frac{1}{\sqrt{2}}\begin{bmatrix}1\\-j\end{bmatrix}x_3\right) = \quad \text{[Equation 6]}$$
$$\begin{bmatrix}h_1 & h_2\\h_3 & h_4\end{bmatrix}\left(\frac{1}{2}\begin{bmatrix}1\\j\end{bmatrix}(x_1) + \frac{1}{2}\begin{bmatrix}1\\-j\end{bmatrix}(x_2 + \sqrt{2}x_3)\right)$$

In Equations (3) to (6) above, $$\begin{bmatrix}h_1 & h_2\\h_3 & h_4\end{bmatrix}$$

denotes a channel matrix, $x_1$ and $x_2$ denote signals transmitted to the NU, and $x_3$ denotes a signal transmitted to the FU.

In the above four cases (cases 1, 2, 7 and 8), only a signal of the NU signal is transmitted in one of the two layers transmitted to the NU, and a signal of the FU is superposed on the signal of the NU in the other layer so as to be transmitted.

In an example of the superposed constellation used here, if modulation orders of both NU and FU are QPSK, the gray labeled constellation may be expressed as illustrated in FIG. 11.

FIG. 11 illustrates an example of a gray labeled constellation method when two UEs use the same precoding vector.

FIG. 12 illustrates a bit-level gray converter to which the methods proposed in this disclosure may be applied.

The superposed constellation as illustrated in FIG. 11 may be defined in advance and a gray labeled constellation method may be used, or a gray level constellation method which implements a superposed constellation using the bit-level gray converter as illustrated in FIG. 12 based on the notation of Table 5 may also be used.

TABLE 5

| Notation |
|---|
| M, N → → Modulation order of high power signal and low power signal, respectively |
| Bit sequence corresponding to a modulated symbol of high power (far UE) signal → a1, a2, . . . , aM |
| Bit sequence corresponding to a modulated symbol of low power (near UE) signal → b1, b2, . . . , Bn |
| Bit sequence corresponding a modulated symbol of converted signal from low power signal → c1, c2, . . . , cN |

Next, cases 3, 4, 5, and 6 of Table 4 correspond to a case where each UE use different precoding vectors.

A situation in which different precoding vectors are set to be used for each UE may be expressed by Equation 7 and Equation 8 below.

$$\begin{bmatrix} h_1 & h_2 \\ h_3 & h_4 \end{bmatrix} \left( \begin{bmatrix} p_{11} \\ p_{12} \end{bmatrix} x_1 + \begin{bmatrix} p_{21} \\ p_{22} \end{bmatrix} x_2 + \begin{bmatrix} p_{31} \\ p_{32} \end{bmatrix} x_3 \right)$$ [Equation 7]

In Equation 7, $$\begin{bmatrix} p_{11} \\ p_{12} \end{bmatrix} \text{ and } \begin{bmatrix} p_{21} \\ p_{22} \end{bmatrix}$$

denotes precoding vectors for the NU and $$\begin{bmatrix} p_{31} \\ p_{32} \end{bmatrix}$$

denotes a precoding vector for the FU.

Here, Equation 7 may be summarized by Equation 9 below.

$$\begin{bmatrix} h_1 & h_2 \\ h_3 & h_4 \end{bmatrix} \left( \begin{bmatrix} p_{11} \\ p_{12} \end{bmatrix} (x_1 + \alpha x_3) + \begin{bmatrix} p_{21} \\ p_{22} \end{bmatrix} (x_2 + \beta x_3) \right)$$ [Equation 8]

$\alpha$ and $\beta$ defined in Equation 8 may be determined through Equations regarding cases 3, 4, 5, and 6 of Table 4.

First, case 3 of Table 4 may be expressed by Equation 9 below.

$$\begin{bmatrix} h_1 & h_2 \\ h_3 & h_4 \end{bmatrix} \left( \frac{1}{2} \begin{bmatrix} 1 \\ 1 \end{bmatrix} x_1 + \frac{1}{2} \begin{bmatrix} 1 \\ -1 \end{bmatrix} x_2 + \frac{1}{\sqrt{2}} \begin{bmatrix} 1 \\ j \end{bmatrix} x_3 \right) =$$ [Equation 9]

$$\begin{bmatrix} h_1 & h_2 \\ h_3 & h_4 \end{bmatrix} \left( \frac{1}{2} \begin{bmatrix} 1 \\ 1 \end{bmatrix} \left( x_1 + \frac{1+j}{\sqrt{2}} x_3 \right) + \frac{1}{2} \begin{bmatrix} 1 \\ -1 \end{bmatrix} \left( x_2 + \frac{1-j}{\sqrt{2}} x_3 \right) \right)$$

Next, case 4 of Table 4 may be expressed by Equation 10 below.

$$\begin{bmatrix} h_1 & h_2 \\ h_3 & h_4 \end{bmatrix} \left( \frac{1}{2} \begin{bmatrix} 1 \\ 1 \end{bmatrix} x_1 + \frac{1}{2} \begin{bmatrix} 1 \\ -1 \end{bmatrix} x_2 + \frac{1}{\sqrt{2}} \begin{bmatrix} 1 \\ -j \end{bmatrix} x_3 \right) =$$ [Equation 10]

$$\begin{bmatrix} h_1 & h_2 \\ h_3 & h_4 \end{bmatrix} \left( \frac{1}{2} \begin{bmatrix} 1 \\ 1 \end{bmatrix} \left( x_1 + \frac{1-j}{\sqrt{2}} x_3 \right) + \frac{1}{2} \begin{bmatrix} 1 \\ -1 \end{bmatrix} \left( x_2 + \frac{1+j}{\sqrt{2}} x_3 \right) \right)$$

Next, case 5 of Table 4 may be expressed by Equation 11 below.

$$\begin{bmatrix} h_1 & h_2 \\ h_3 & h_4 \end{bmatrix} \left( \frac{1}{2} \begin{bmatrix} 1 \\ j \end{bmatrix} x_1 + \frac{1}{2} \begin{bmatrix} 1 \\ -j \end{bmatrix} x_2 + \frac{1}{\sqrt{2}} \begin{bmatrix} 1 \\ 1 \end{bmatrix} x_3 \right) =$$ [Equation 11]

$$\begin{bmatrix} h_1 & h_2 \\ h_3 & h_4 \end{bmatrix} \left( \frac{1}{2} \begin{bmatrix} 1 \\ j \end{bmatrix} \left( x_1 + \frac{1-j}{\sqrt{2}} x_3 \right) + \frac{1}{2} \begin{bmatrix} 1 \\ -j \end{bmatrix} \left( x_2 + \frac{1+j}{\sqrt{2}} x_3 \right) \right)$$

Next, case 6 of Table 4 may be expressed by Equation 12 below.

$$\begin{bmatrix} h_1 & h_2 \\ h_3 & h_4 \end{bmatrix} \left( \frac{1}{2} \begin{bmatrix} 1 \\ j \end{bmatrix} x_1 + \frac{1}{2} \begin{bmatrix} 1 \\ -j \end{bmatrix} x_2 + \frac{1}{\sqrt{2}} \begin{bmatrix} 1 \\ -1 \end{bmatrix} x_3 \right) =$$ [Equation 12]

$$\begin{bmatrix} h_1 & h_2 \\ h_3 & h_4 \end{bmatrix} \left( \frac{1}{2} \begin{bmatrix} 1 \\ j \end{bmatrix} \left( x_1 + \frac{1+j}{\sqrt{2}} x_3 \right) + \frac{1}{2} \begin{bmatrix} 1 \\ -j \end{bmatrix} \left( x_2 + \frac{1+j}{\sqrt{2}} x_3 \right) \right)$$

When all the results of Equation 9 to Equation 12 are put together, a value which may become $\alpha$ and $\beta$ is $$\frac{1 \pm i}{\sqrt{2}} = e^{\pm j\frac{\pi}{4}}.$$

This means that, in case 3 and case 6, the constellation of the FU is rotated by $$+\frac{\pi}{4},$$

and in case 4 and case b, the constellation of the FU is rotated by $$-\frac{\pi}{4}.$$

Therefore, when NU and FU use different precoding vectors, a superposed constellation generated by the rotated constellation of a specific UE generated accordingly may be determined through the following two methods (method 1 and method 2).

(Method 1): Gray Leveled Constellation Method Using Rotated Constellation

In Method 1, it may be configured such that the NU and the FU selects one of previously determined superposed constellations according to a modulation order determined according to information fed back by the NU and the FU to the BS and precoding vector information determine to be used.

As an example for method 1, in case where the NU is determined to use QPSK, the FU is determined to use QPSK, the NU is determined to use two layers, the FU is determined to use one layer, and the NU and the FU are determined to use different precoding vectors so the constellation of the FU needs to be rotated by $$\pm\frac{\pi}{4},$$

previously determined superposed constellation may be defined as illustrated in FIGS. 13 and 14.

FIG. 13 is a view illustrating an example of a previously determined superposed constellation proposed in the present disclosure.

That is, FIG. 13 illustrates a previously determined superposed constellation when the constellation of the FU is rotated by $$+\frac{\pi}{4}.$$

In the case of FIG. 13, each UE uses QPSK and QPSK modulation orders.

FIG. 14 illustrates another example of the previously determined superposed constellation proposed in the present disclosure.

That is, FIG. 14 illustrates a previously determined superposed constellation when the constellation of the FU is rotated by $$-\frac{\pi}{4}.$$

In the case of FIG. 14, the UEs use QPSK and QPSK modulation orders, respectively.

In another example of method 1, in case where the NU is determined to use modulation order 16 QAM, the FU is determined to use modulation order QPSK, the NU is determined to use 2 layers, the FU is determined to use 1 layer, and the NU and the FU are determined to use different precoding vectors so the constellation of the FU needs to be rotated by $$\pm\frac{\pi}{4},$$

a previously determined superposed constellations may be defined as illustrated in FIGS. 15 and 16 below.

FIG. 15 is a view illustrating another example of a previously determined superposed constellation proposed in the present disclosure.

That is, FIG. 15 illustrates a previously determined superposed constellation when the constellation of the FU is rotated by $$+\frac{\pi}{4}.$$

In the case of FIG. 15, the UEs use 16 QAM and QPSK modulation orders, respectively.

FIG. 16 illustrates another example of a previously determined superposed constellation proposed in the present disclosure.

That is, FIG. 16 illustrates a previously determined superposed constellation when the constellation of the FU is rotated by $$-\frac{\pi}{4}.$$

In the case of FIG. 16, the UEs use 16 QAM and QPSK modulation orders, respectively.

In another example of method 1, in case where the NU is determined to use QPSK, the FU is determined to use 16 QAM, the NU is determined to use two layers, the FU is determined to use one layer, and the NU and FU are determined to use different precoding vectors so the constellation of the FU needs to be rotated by $$\pm\frac{\pi}{4},$$

a previously determined superposed constellation may be expressed as illustrated in FIGS. 17 and 18.

FIG. 17 is a view illustrating another example of a previously determined superposed constellation proposed in the present disclosure.

That is, FIG. 17 illustrates a previously determined superposed constellation determined when the constellation of the FU is rotated by $$+\frac{\pi}{4}.$$

In the case of FIG. 17, the UEs use QPSK and 16 QAM modulation orders.

FIG. 18 illustrates another example of a previously determined superposed constellation proposed in the present disclosure.

That is, FIG. 18 illustrates a previously determined superposed constellation when the constellation of the FU rotates by $$-\frac{\pi}{4}.$$

In the case of FIG. 18, the UEs use the QPSK and 16 QAM modulation orders, respectively.

Expanding using a method similar to this approach, other superposed constellations (64 QAM+QPSK, 16 QAM+16 QAM, QPSK+64 QAM, etc.) may also be defined in advance.

(Method 2): Gray Labeled Constellation Method Based on Predetermined Notation

Next, a method 2 will be described.

The method 2 is a gray labeled constellation implementing a superposed constellation according to a predefined notation by the NU and the FU using a constellation defined in the existing 3GPP specification according to modulation order determined according to information fed by the NU and the FU to the BS and precoding vector information determined to be used by the NU and the FU.

As an example of method 2, in case where the NU is determined to use QPSK, the FU is determined to use QPSK, the NU is determined to use two layers, the FU is determined to use one layer, and the NU and FU are determined to use different precoding vectors so the constellation of the FU needs to rotated by $$\pm\frac{\pi}{4},$$

a predetermined notation predefined for implementing a superposed constellation may be defined as illustrated in Tables 6 and 7 below.

Table 6 below illustrates a notation in case where the constellation needs to be rotated by $$+\frac{\pi}{4},$$

and Table 7 below illustrates a notation in case where the constellation needs to be rotated by $-\frac{\pi}{4}$.

TABLE 6

When bit of NU (UE1) is (a1a2), bit of FU (UE0) is (b1b2), and superposed bit is (c1c2c3c4), c1=b1; c2=b2;
if b1==b2
    c3 = XNOR(a1,b1); c4 = XNOR(a2,b2);
else
  if a1==a2
    c3 = XNOR(a1,b1); c4 = XOR(a2,b2);
  else
    c3 = XOR(a1,b1); c4 = XNOR(a2,b2);
  end if
end if

TABLE 7

When bit of NU (UE1) is (a1a2), bit of FU (UE0) is (b1b2), and superposed bit is (c1c2c3c4), c1=b1; c2=b2;
if b1==b2
    c3 = XNOR(a1,b1); c4 = XNOR(a2,b2);
else
  if a1==a2
    c3 = XOR(a1,b1); c4 = XNOR(a2,b2);
  else
    c3 = XNOR(a1,b1); c4 = XOR(a2,b2);
  end if
end if Here, in the case of XOR (a, b), XOR (exclusive OR) operation is '0' if a and b are the same and '1' if a and b are different.

In the case of XNOR (a, b), XNOR (complement of XOR) operation is '1' if a and b are the same and '0' if a and b are different.

When the constellations of the respective UEs are directly superposed without applying the predetermined notations of Tables 6 and 7 (when the constellation of the FU is rotated by $$\frac{\pi}{4}),$$

a non-gray superposed constellation is created as illustrated in FIG. 19.

In the non-gray superposed constellation, since a difference in bit value between immediately adjacent constellations is larger than 1 bit, it may be considered that the gray characteristic is broken.

FIG. 19 is a view illustrating an example of a superposed constellation generated by superposing constellations of the UEs without applying a predetermined notation. That is, FIG. 19 illustrates a superposed constellation generated by superposing constellations 1910 and 1920 without applying the notation of FIGS. 6 and 7 when a constellation 2020 of the FU (UE 0) is rotated by $$\frac{\pi}{4},$$

and since gray characteristic is broken, the superposed constellation is expressed as a non-gray superposed constellation.

The NU is denoted as UE 1 in FIG. 19.

As illustrated in FIG. 19, it can be seen that, when specific points (or specific bit sequences) '00', '01', '10' and '11' (1911) of the constellation of the UE 1 (NU) and a specific point (or specific bit sequence) '00' (1921) of the constellation of the UE 0 (FU) are superposed through the conventional gray labeled constellation method, they are mapped to '0000', '0001', '0010' and '0011' (1931) of the superposed constellation, respectively.

Here, the gray labeled constellation method is a method in which the bit sequence '00' of the FU is written on the front side and the bit sequence '00', '01', '10', and '11' are written on the rear side thereof.

Here, as illustrated in FIG. 19, it can be seen that, in the superposed constellation, a difference in bit value between '0001' and the adjacent point '0110' is 1 bit or greater.

Unlike FIG. 19, in case where a superposed constellation is configured according to the predetermined notations illustrated in Table 6 and Table 7 (in case where the constellation of the FU is rotated by $$\frac{\pi}{4}),$$

the gray superposed constellation (or gray labeled constellation) proposed in this disclosure is created as illustrated in FIG. 20.

That is, FIG. 20 is a view illustrating an example of a superposed constellation generated by superposing constellations of UEs by applying a predetermined notation proposed in the present disclosure. In detail, when bits of NU (UE1) are (1, 0) (2010) and the bits of FU (UE2) are (0,1) (2020), the superposed constellations (c1, c2, c3, c4) may be calculated as follows. First, since c1=b1 and c2=b2, c1=0 and c2=1.

Next, since b1 and b2 are not the same and a1 and a2 are also not the same, c3=XOR(a1,b1)=XOR(1,0); c4=XNOR(a2,b2)=XNOR(0,1), so that c3=1 and c4=0.

Therefore, the superposed constellation generated according to the corresponding predetermined notation is (0, 1, 1, 0) (2030). When the superposed constellation is received, the FU may perform decoding thereon according to the existing method, and NU may be assumed to know precoding vector information used by the FU in advance (the BS previously provides it to the FU), remove a signal of the FU, and subsequently decode a signal of the NU.

Here, when the NU removes the signal of the FU, a constellation position of the NU that varies according to the constellation of the FU may be known through the predetermined notation of Table 6.

In another example of method 2, in case where the NU is determined to use 16 QAM, the FU is determined to use QPSK, the NU is determined to use 2 layers, the FU is determined to use 1 layer, and the NU and the FU use different precoding vectors soothe constellation of the FU needs to be rotated by $$\pm\frac{\pi}{4},$$

a predetermined notation for configuring a superposed constellation may be defined as illustrated in Table 8 to Table 13 below.

TABLE 8

When bit of NU (UE1) is (a1a2a3a4), bit of FU (UE0) is (b1b2), and superposed bit is (c1c2c3c4c5c6),
c1=b1; c2=b2;
if b1 == b2
    c3 = XNOR(a1,b1); c4 = XNOR(a2,b2); c5=a3; c6=a4;
else
    if a1 == a2
        c3 = XNOR(a1,b1); c4 = XOR(a2,b2);
    else
        c3 = XOR(a1,b1); c4 = XNOR(a2,b2);
    end if
    if a3 == a4
        c5=a3; c6=a4;
    else
        c5=~a3; c6=~a4;
    end if
end if Table 8 illustrates a notation for implementing a superposed constellation when the constellation of FU is rotated by $$\frac{\pi}{4},$$

and in this case, the NU and the FU use 16 QAM and QPSK, respectively.

TABLE 9

When bit of NU (UE1) is (a1a2a3a4), bit of FU (UE0) is (b1b2), and superposed bit is (c1c2c3c4c5c6),
c1=b1; c2=b2;
if b1 == b2
    c3 = XNOR(a1,b1); c4 = XNOR(a2,b2); c5=a3; c6=a4;
else
    if a1 == a2
        c3 = XOR(a1,b1); c4 = XNOR(a2,b2);
    else
        c3 = XNOR(a1,b1); c4 = XOR(a2,b2);
    end if
    if a3 == a4
        c5=a3; c6=a4;
    else
        c5=~a3; c6=~a4;
    end if
end if Table 9 illustrates a notation for implementing a superposed constellation when the constellation of FU is rotated by $$-\frac{\pi}{4},$$

and in this case, the NU and the FU use 16 QAM and QPSK, respectively.

In Table 8 and Table 9, the operation of ~a is 0 when a is 1, and 1 when a is 0.

In another example of method 2, in case where the NU is determined to use 64 QAM, the FU is determined to use QPSK, the NU is determined to use 2 layers, the FU is determined to use 1 layer, and the NU and FU use different precoding vectors so the constellation of the FU needs to be rotated by $$\pm\frac{\pi}{4},$$

a notation for implementing the superposed constellation may be defined as illustrated in Table 10 and Table 11 below.

TABLE 10

When bit of NU (UE1) is (a1a2a3a4a5a6), bit of FU (UE0) is (b1b2), and superposed bit is (c1c2c3c4c5c6c7c8),
c1=b1; c2=b2;
if b1 == b2
    c3 = XNOR(a1,b1); c4 = XNOR(a2,b2); c5=a3; c6=a4; c7=a5; c8=a6;
else
    if a1 == a2
        c3 = XNOR(a1,b1); c4 = XOR(a2,b2);
    else
        c3 = XOR(a1,b1); c4 = XNOR(a2,b2);
    end if
    if a3 == a4
        c5=a3; c6=a4;
    else
        c5=~a3; c6=~a4;
    end if
    if a5 == a6
        c7=a5; c8=a6;
    else
        c7=~a5; c8=~a6;
    end if
end if Table 10 illustrates a notation for implementing a superposed constellation when the constellation of the FU is rotated by $$\frac{\pi}{4},$$

and in this case, the NU and the FU use 64 QAM and QPSK, respectively.

TABLE 11

When bit of NU (UE1) is (a1a2a3a4a5a6), bit of FU (UE0) is (b1b2), and superposed bit is (c1c2c3c4c5c6c7c8),
c1=b1; c2=b2;
if b1 == b2
    c3 = XNOR(a1,b1); c4 = XNOR(a2,b2); c5=a3; c6=a4; c7=a5; c8=a6;
else
    if a1 == a2
        c3 = XOR(a1,b1); c4 = XNOR(a2,b2);
    else
        c3 = XNOR(a1,b1); c4 = XNOR(a2,b2);
    end if
    if a3 == a4
        c5=a3; c6=a4;
    else
        c5=~a3; c6=~a4;
    end if
    if a5 == a6
        c7=a5; c8=a6;
    else
        c7=~a5; c8=~a6;
    end if
end if Table 11 illustrates a notation for implementing a superposed constellation implementation when the constellation of the FU is rotated by $-\frac{\pi}{4}$, and in this case, the NU and the FU use 64 QAM and QPSK, respectively.

In another example of method 2, in case where the NU is determined to use QPSK, the FU is determined to use 16 QAM, the NU is determined to use 2 layers, the FU is determined to use 1 layer, and the NU and FU use different precoding vectors so the constellation of the FU needs to be rotated $$\pm \frac{\pi}{4},$$

a notation Tor implementing a superposed constellation may be defined as illustrated in Table 12 and Table 13 below.

TABLE 12

When bit of NU (UE1) is (a1a2), bit of FU (UE0) is (b1b2b3b4), and superposed bit is (c1c2c3c4c5c6),
c1=b1; c2=b2; c3=a3; c4=a4;
if a1 == a2
    if b1 == b3
        c5=a1; c6=a2;
    else
        c5=~a1; c6=~a2;
    end if
else
    if b2 == b4
        c5=a1; c6=a2;
    else
        c5=~a1; c6=~a2;
    end if
end if Table 12 illustrates a notation for implementing a superposed constellation when the constellation of FU is rotated by $$\frac{\pi}{4},$$

and in this case, the NU and the FU use QPSK and 16 QAM, respectively.

TABLE 13

When bit of NU(UE1) is (a1a2), bit of FU (UE0) is (b1b2b3b4), and superposed bit is (c1c2c3c4c5c6),
c1=b1; c2=b2; c3=a3; c4=a4;
if a1 == a2
    if b2 == b4
        c5=a1; c6=a2;
    else
        c5=~a1; c6=~a2;
    end if
else
    if b1 == b3
        c5=a1; c6=a2;
    else
        c5=~a1; c6=~a2;
    end if
end if Table 13 illustrates a notation for implementing a superposed constellation when the constellation of FU is rotated by $$-\frac{\pi}{4},$$

and in this case, the NU and the FU use QPSK and 16 QAM, respectively.

By expanding using methods similar to those described above, notations for implementing other superposed constellations (16 QAM+16 QAM, QPSK+64 QAM, etc.) may also be defined in advance.

In method 1 and method 2, it is assumed that the NU uses two layers and the FU uses one layer.

Hereinafter, in another method different from the foregoing methods, it is assumed that the NU uses one layer and the FU uses two layers in a closed-loop feedback environment.

Even when the NU uses one layer and the FU uses two layers, the constellation of the NU may be rotated by $$\pm \frac{\pi}{4}.$$

As can be seen from FIGS. 21 and 22, also in this case, a method similar to the gray labeled constellation method proposed in this disclosure may be used.

FIGS. 21 and 22 illustrate another example of a configuration of a superposed constellation suggested in the present disclosure.

Specifically, FIG. 21 illustrates an example of a configuration of a superposed constellation when the constellation of the NU is rotated by $$\frac{\pi}{4},$$

and the modulation orders of QPSK and QPSK may be applied to the NU and the FU, respectively.

FIG. 22 illustrates an example of a superposed constellation when the constellation of the NU is rotated by $$-\frac{\pi}{4},$$

and the modulation orders of QPSK and QPSK are applied to the NU and FU, respectively.

That is, as illustrated in FIG. 21, in case where the constellation of the NU is rotated by $$+\frac{\pi}{4},$$

the scheme used when the constellation of the FU was rotated by $$-\frac{\pi}{4}$$

may be applied, and as illustrated in FIG. 22, when the constellation of the FU is rotated by $$-\frac{\pi}{4},$$

the scheme used when the constellation of the NU was rotated by $$+\frac{\pi}{4}$$

may be applied.

That is, as discussed in the above embodiments, in case where the NU and the FU using different numbers of layers use different precoding vectors, a rotated superposed constellation may be configured by applying a specific value to a signal of the FU (or NU) through previously agreed calculation.

Here, the specific value to be calculated for the signal of the FU is determined as a function of a precoding vector used by one UE and a precoding vector used by another UE.

In another embodiment, in the cases 3, 4, 5, and 6 of Table 4, a rotated superposed constellation may be implemented using the methods used when the constellations of the two UEs are not rotated, by rotating also the constellation of the NU by an amount by which the constellation of the FU was rotated.

That is, Equation 8 may be expressed as Equation 13 below to implement (or configure) the rotated superposition constellation.

$$\begin{bmatrix} h_1 & h_2 \\ h_3 & h_4 \end{bmatrix} \left( \begin{bmatrix} p_{11} \\ p_{12} \end{bmatrix} \left( \frac{\alpha}{|\alpha|} x_1 + \alpha x_3 \right) + \begin{bmatrix} p_{21} \\ p_{22} \end{bmatrix} \left( \frac{\beta}{|\beta|} x_2 + \beta x_3 \right) \right) \quad \text{[Equation 13]}$$

In Equation 13 above, a value that may become $\alpha$ and $\beta$ is $$\frac{1 \pm j}{2} = \frac{1}{\sqrt{2}} e^{\pm j\frac{\pi}{4}}.$$

The superposed constellation implemented using such a method may be illustrated as shown in FIGS. 23 and 24.

FIG. 23 illustrates a superposed constellation when the constellations of FU and NU are rotated by $$+\frac{\pi}{4},$$

and in this case, modulation orders QPSK and QPSK are applied.

FIG. 24 illustrates a superposed constellation when the constellations of FU and NU are rotated by $$-\frac{\pi}{4},$$

and QPSK and QPSK are applied as modulation orders of each UE.

In addition, in a method (FIGS. 23 and 24) of implementing a rotated superposed constellation by applying a specific value to signals of both NU and FU through a previously agreed calculation, the mentioned specific value is first applied to a precoding vector to be used by a UE which uses a larger number of layers, among the UEs, through a previously agreed calculation (i.e., the precoding vector value is changed).

Thereafter, it is the same as the method of applying the changed precoding vector to the superposed constellation implemented to reflect the power allocation factor and an absolute value of the mentioned specific value and rotating the same.

This may be confirmed through Equation 14 summarized from Equation 13.

$$\begin{bmatrix} h_1 & h_2 \\ h_3 & h_4 \end{bmatrix} \left( \frac{\alpha}{|\alpha|} \begin{bmatrix} p_{11} \\ p_{12} \end{bmatrix} (x_1 + |\alpha|x_3) + \frac{\beta}{|\beta|} \begin{bmatrix} p_{21} \\ p_{22} \end{bmatrix} (x_2 + |\beta|x_3) \right) \quad \text{[Equation 14]}$$

In case where the constellation of the NU is rotated by an amount by which the FU is rotated, the rotated superposed constellation as illustrated in FIGS. 23 and 24 may be predefined and used, or alternatively, the conventional gray labeled constellation notation which is established before the constellations of both the NU and the FU described above are not rotated may be applied.

The advantage of the method of using the conventional gray labeled constellation notation is that overhead of signaling transmitted from the base station (e.g., eNB) to the UE for signal decoding is reduced to be smaller than signaling overhead when only one of the UEs rotates the constellation.

In addition, although the XNOR operation and the XOR operation are used within the predetermined notation defined for the configuration of the superposed constellation proposed in the present disclosure are used, a similar result may be obtained when the two operations are interchanged with each other in position.

Here, the similar result is that a difference in bit value between adjacent points on the superposed constellation may be maintained by 1 bit, although an actual bit sequence of the adjacent points of the superposed constellation are different.

It is also assumed that the bit sequences are arranged in the order from FU to NU in the predetermined notation, but the same principle may be applied even when it is assumed that the bit sequences are arranged in order from the NU to the FU.

Additionally, in the NOMA system, the NU may receive control information related to signal decoding from the eNB through a DCI for desired signal decoding, overhear information about a signal of the FU, or obtain the information through blind decoding.

Here, the eNB may be configured to transmit a specific value ($\alpha$ or $\beta$) calculated through a previously agreed function to the NU on the basis of a power allocation factor, a modulation order of each UE, a precoding vector index of each UE, and a precoding vector to be used by each UE.

In this manner, the NU may decode a desired signal by implementing the rotated superposed constellation (or the rotated constellation for the UE) on the basis of the information received from the eNB.

Here, the NU may implement a rotated superposed constellation by applying a value calculated through a previously agreed function to the previously implemented superposed constellation using information (e.g., precoding vector index of each UE) received from the eNB.

It may be configured such that the NU finds out α and β (here, if the number of layers is large, there may be an additional variable) of Equation 8 or Equation 13 through blind decoding if the eNB does not inform the NU about the precoding vector index or a specific value (calculated through a previously agreed function based on a precoding vector) among the information described above.

Alternatively, it may be configured such that the NU overhears the DCI transmitted for the FU to find out the precoding vector index for the FU to use.

In addition, it may be configured such that a specific value (calculated through a previously agreed function based on each precoding vector) is separated into a magnitude and a phase and the magnitude is directly informed by the eNB and the NU may know the phase through blind detection.

Conversely, it may be configured such that the phase is informed directly to the NU by the eNB and the NU may know the magnitude through blind detection.

In addition, it may be configured such that, when the number of specific values to be informed by the eNB to the NU increases or the number of values that one specific value may have increases, the eNB may set some of the values that a specific value may have as a specific set, and thereafter, when the eNB sends an appropriate set index to the NU, the NU may find out the specific value through blind detection among the values belonging to the set.

As a method of reducing signaling overhead of the eNB, all of the obtainable superposed constellation may be predefined in the form of a table according to the number of layers, modulation order, and the like, in addition to the gray labeled (superposed) constellation methods proposed in this disclosure.

Here, it may be configured such that the eNB signals a constellation index corresponding to the superposed constellation to be used and the power allocation factor to the UE.

Additionally, the NU may need to know the power allocation information for implementation of the rotated constellation.

As a method, it may be configured such that the UE for implementing the rotated constellation receives the power allocation factor value and the specific value calculated through a previously agreed function based on each precoding vector from the eNB and calculates it through a previously agreed function to find out a power value to be applied to the rotated constellation.

Here, the power allocation factor indicates a value for how much the NU and the FU are allocated with respect to the total power, and in this disclosure, the power allocation factor may be defined as (NU power per layer)/(total power per layer).

Assuming that the constellation of the FU is rotated, when the eNB transmits a power allocation factor 0.2 to each UE and the above-mentioned specific value (e.g., α and β of the above example when it is assumed that 2 layers are used) is transmitted to the NU, the NU may implement the rotated constellation of the interfered signal.

That is, in the first layer, the NU may implement the rotated constellation by obtaining an allocation factor reduced compared with a reference signal (RS) power through a predefined function (e.g., (1-power allocation factor)*$|α|^2$)) based on 0.8 (1-power allocation factor) and the aforementioned specific value (e.g., α).

Also, in the second layer, the NU may implement the rotated constellation by obtaining an allocation factor reduced compared with a reference signal (RS) power through a predefined function (e.g., (1-power allocation factor)*$|β|^2$)) based on 0.8 and the aforementioned specific value (e.g., β).

In this manner, when the NU receives information necessary for desired signal decoding from the eNB, the NU may suppress interference of the second layer through IRC BF (interference rejection combining beam forming) and decode a desired signal in consideration of both the desired signal and an interfered signal by applying a specific value obtained on the basis of information received previously for the first layer in the case of an ML receiver.

In the case of using a CWIC receiver, the NU may first decode the interfered signal. If the decoding is successful, the NU may re-encode the decoded signal to remove the re-encoded interfered signal from the previous received signal to decode the desired signal.

Thereafter, the NU may decode the desired signal through the same method as that of the first layer for the second layer.

This operation may be applied when NOMA pairing is in progress. In the case where the NOMA pairing does not proceed, the superposed constellation needs not be implemented, and thus, it operates in the same manner as in the existing LTE environment.

FIG. 25 is a flowchart illustrating an example of a method of transmitting and receiving signals in a NOMA system proposed in the present disclosure.

First, the BS sets a first modulation scheme and a first transmission power to a first signal to be transmitted to a first terminal (S2510) and sets a second modulation scheme and a second transmission power to a second signal to be transmitted to a second terminal (S2520).

Here, the first terminal represents an NU (Near UE) and the second terminal represents an FU (Far UE).

A distance between the first terminal and the BS is closer to a distance between the second terminal and the BS.

Also, the first transmission power is set to be lower than the second transmission power, the first signal is transmitted at high power, and the second signal is transmitted at low power.

Also, the first modulation scheme and the second modulation scheme may have any one of QPSK, 16 QAM, and 64 QAM.

Thereafter, the BS superimposes the first signal and the second signal (S2530).

Step S2530, that is, a process in which the BS superimposes the first signal and the second signal, will be described in detail.

First, the BS configures a superposed constellation using a first constellation according to the first modulation scheme and a second constellation according to the second modulation scheme (S2531).

After step S2531, the BS combines modulation symbols of the first signal and modulation symbols of the second signal and maps the same to the configured superposed constellation (S2532).

Here, the superposed constellation may be predefined in advance or may be configured by a predetermined notation.

The superposed constellation may be configured such that a bit value difference for a bit sequence of adjacent points is one bit or less.

Also, the superposed constellation is configured when a first precoding vector applied to the first terminal is different from a second precoding vector applied to the second terminal.

Here, if the specific column of the first precoding vector and a specific column of the second precoding vector are not the same, the first precoding vector and the second precoding vector are different from each other.

The predefined superposed constellation may be configured by rotating at least one of the first constellation or the second constellation by a predetermined value.

Thereafter, the BS transmits the superimposed signal to the FU and the NU (S2540).

In addition, the BS may transmit control information related to cancellation of interference generated by the first signal to the first terminal. The control information may include at least one of the rotated predetermined value and a precoding vector index indicating a precoding vector of the first terminal and the second terminal.

The predetermined notation is a notation that uses a relation between a bit value constituting a bit sequence corresponding to a modulation symbol of the first signal and a bit value constituting a bit sequence corresponding to a modulation symbol of the second signal.

General Device to which Present Invention May be Applied

FIG. 26 is a block diagram of a wireless communication device according to an embodiment of the present invention.

Referring to FIG. 26, a wireless communication system includes a base station (BS) (or eNB) 2610 and a plurality of terminals (or UEs) 2620 located within coverage of the BS 2610. Here, the terminal 2620 may be the UE, the node device, the RRH, the delay, the TP/RP, the RSU, and the like, described above. The eNB 2610 includes a processor 2611, a memory 2612, and a radio frequency (RF) unit 2613. The processor 2611 implements functions, processes and/or methods proposed in FIGS. 1 through 29. Layers of radio interface protocols may be implemented by the processor 2611. The memory 2612 may be connected to the processor 2611 to store various types of information for driving the processor 2611. The RF unit 2613 may be connected to the processor 2611 to transmit and/or receive a wireless signal.

The UE 2620 includes a processor 2621, a memory 2622, and a radio frequency (RF) unit 2623. The processor 2621 implements functions, processes and/or methods proposed in above-described embodiments. Layers of radio interface protocols may be implemented by the processor 2621. The memory 2622 may be connected to the processor 2621 to store various types of information for driving the processor 2621. The RF unit 2623 may be connected to the processor 2621 to transmit and/or receive a wireless signal.

The memory 2612 or 2622 may be present within or outside of the processor 2611 or 2621 and may be connected to the processor 2611 or 2621 through various well known units. Also, the eNB 2610 and/or the UE 2620 may have a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for transmitting and receiving data in a wireless communication system of the present invention has been described on the basis of the example applied to the 3GPP LTE/LTE-A system, but the present invention may also be applied to various wireless communication systems other than the 3GPP/LTE/LTE-A system.

The invention claimed is:

1. A method for transmitting and receiving signals using non-orthogonal multiple access (NOMA) in a wireless communication system, the method performed by a base station (BS) comprising: configuring a first modulation scheme and first transmission power for a first signal to be transmitted to a first user equipment (UE); configuring a second modulation scheme and second transmission power for a second signal to be transmitted to a second UE; generating a superposed constellation based on a first constellation and a second constellation, generating the first signal based on the first constellation, generating the second signal based on the second constellation, and generating a superposed signal based on the superposed constellation; and transmitting the superposed signal to the first UE and the second UE, wherein at least one of the first constellation or the second constellation is rotated by a predetermined value based on a first precoding vector applied to the first UE and a second precoding vector applied to the second UE when the first precoding vector is different from the second precoding vector, wherein the superposed constellation is generated by superposing the first constellation and the second constellation based on a predetermined rule, and wherein the predetermined rule is determined based on the first precoding vector, the second precoding vector, the first modulation scheme and the second modulation scheme.

2. The method of claim 1, wherein the superposed constellation is configured such that a difference between bit values regarding a bit sequence of adjacent points is 1 bit or less.

3. The method of claim 1, wherein when a specific column of the first precoding vector and a specific column of the second precoding vector are not the same, the first precoding vector is different from the second precoding vector.

4. The method of claim 1, further comprising: transmitting control information related to cancellation of interference generated by the first signal to the first UE.

5. The method of claim 4, wherein the control information includes at least one of the predetermined value and a precoding vector index representing a precoding vector of the first UE and the second UE.

6. The method of claim 1, wherein the predetermined rule uses a relation between a bit value constituting a bit sequence corresponding to the modulation symbol of the first signal and a bit value constituting a bit sequence corresponding to the modulation symbol of the second signal.

7. The method of claim 1, wherein the first transmission power is set to be lower than the second transmission power.

8. The method of claim 1, wherein a distance between the first UE and the BS is shorter than a distance between the second UE and the BS.

9. The method of claim 1, wherein the first modulation scheme and the second modulation scheme each are any one of QPSK, 16 QAM, and 64 QAM.

10. The method of claim 1, wherein the superposed constellation is generated based on a second rule when the first precoding vector is the same as the second precoding vector, when both of the first constellation and the second constellation are rotated by the predetermined value, and wherein the second rule is different from the predetermined rule.

11. The method of claim 1, wherein the predetermined value is 45°.

12. A base station (BS) for transmitting and receiving data using non-orthogonal multiple access (NOMA) in a wireless communication system, the base station comprising: a transmitter and receiver; and a processor functionally connected to the transmitter and receiver, wherein the processor is configured to: configure a first modulation scheme and first transmission power for a first signal to be transmitted to a first user equipment (UE), configure a second modulation scheme and second transmission power for a second signal to be transmitted to a second UE, generate a superposed constellation based on a first constellation and a second constellation, generate the first signal based on the first constellation, generate the second signal based on the second constellation, and generate a superposed signal based on the superposed constellation; and control the transmitter to transmit the superposed signal to the first UE and the second UE, wherein at least one of the first constellation or the second constellation is rotated by a predetermined value based on a first precoding vector applied to the first UE and a second precoding vector applied to the second UE when the first precoding vector is different from the second precoding vector, wherein the superposed constellation is generated by superposing the first constellation and the second constellation based on a predetermined rule, and wherein the predetermined rule is determined based on the first precoding vector, the second precoding vector, the first modulation scheme and the second modulation scheme.

* * * * *